United States Patent
Yamada et al.

(10) Patent No.: US 10,593,360 B2
(45) Date of Patent: Mar. 17, 2020

(54) INFORMATION RECORDING MEDIUM AND REPRODUCTION DEVICE

(71) Applicants: Sharp Kabushiki Kaisha, Sakai, Osaka (JP); Memory-Tech Holdings Inc., Tokyo (JP)

(72) Inventors: Hirohisa Yamada, Sakai (JP); Takayuki Naka, Sakai (JP); Masaki Yamamoto, Sakai (JP); Yoshihisa Adachi, Sakai (JP); Hideharu Tajima, Sakai (JP); Masahito Konishi, Chikusei (JP)

(73) Assignees: SHARP KABUSHIKI KAISHA, Sakai (JP); MEMORY-TECH HOLDINGS INC., Tokyo (JP)

( * ) Notice: Subject to any disclaimer, the term of this patent is extended or adjusted under 35 U.S.C. 154(b) by 0 days.

(21) Appl. No.: 16/029,682

(22) Filed: Jul. 9, 2018

(65) Prior Publication Data
US 2018/0315447 A1 Nov. 1, 2018

Related U.S. Application Data

(63) Continuation of application No. 15/609,346, filed on May 31, 2017, now Pat. No. 10,043,545, which is a (Continued)

(30) Foreign Application Priority Data

Sep. 30, 2013 (JP) .................................. 2013-205513

(51) Int. Cl.
*G11B 7/0045* (2006.01)
*G11B 7/007* (2006.01)
(Continued)

(52) U.S. Cl.
CPC ........ *G11B 7/0079* (2013.01); *G11B 7/00736* (2013.01); *G11B 7/013* (2013.01); (Continued)

(58) Field of Classification Search
None
See application file for complete search history.

(56) References Cited

U.S. PATENT DOCUMENTS 5,648,954 A * 7/1997 Satoh ................. G11B 7/08505
369/53.17
9,697,863 B2 * 7/2017 Yamada ............. G11B 20/1217
(Continued)

FOREIGN PATENT DOCUMENTS

JP      2001-312861 A    11/2001
JP      2004-087078 A    3/2004

OTHER PUBLICATIONS

Yamada et al., "Information Recording Medium and Reproduction Device", U.S. Appl. No. 15/609,346, filed May 31, 2017.

*Primary Examiner* — Peter Vincent Agustin
(74) *Attorney, Agent, or Firm* — Keating & Bennett, LLP

(57) ABSTRACT

An optical disk (100) of the present invention includes (i) a medium information region (101) (a) in which type identification information is recorded by recesses and/or protrusions which are formed by a given modulation method and whose lengths are longer than a length of an optical system resolution limit of a playback device and (b) in which first address information is recorded in a first address data format and (ii) a data region (102) (a) in which content data is recorded by recesses and/or protrusions which are formed by the given modulation method and which include a recess and/or a protrusion whose length is shorter than the length (Continued)

of the optical system resolution limit and (b) in which second address information is recorded in a second address data format.

2 Claims, 16 Drawing Sheets

Related U.S. Application Data continuation of application No. 14/917,992, filed as application No. PCT/JP2014/060196 on Apr. 8, 2014, now Pat. No. 9,697,863.

(51) Int. Cl.
*G11B 20/12* (2006.01)
*G11B 27/30* (2006.01)
*G11B 7/24085* (2013.01)
*G11B 7/013* (2006.01)

(52) U.S. Cl.
CPC ...... *G11B 7/24085* (2013.01); *G11B 20/1217* (2013.01); *G11B 27/3027* (2013.01)

(56) References Cited

U.S. PATENT DOCUMENTS

| | | | |
|---|---|---|---|
| 10,043,545 B2* | 8/2018 | Yamada | G11B 20/1217 |
| 2002/0012315 A1 | 1/2002 | Iida et al. | |
| 2003/0147330 A1* | 8/2003 | Teraoka | G11B 7/1369 369/112.02 |
| 2003/0185394 A1 | 10/2003 | Ohbi et al. | |
| 2005/0025010 A1* | 2/2005 | Kim | G11B 7/0948 369/47.27 |
| 2006/0153051 A1* | 7/2006 | Kikukawa | G11B 7/00452 369/275.1 |
| 2010/0208558 A1* | 8/2010 | Sakai | G11B 7/00745 369/47.5 |
| 2010/0220567 A1* | 9/2010 | Tajima | G11B 7/00736 369/47.15 |
| 2016/0125908 A1* | 5/2016 | Naka | G11B 7/0079 369/124.01 |
| 2016/0155469 A1* | 6/2016 | Tajima | G11B 7/13927 369/53.12 |
| 2016/0225398 A1* | 8/2016 | Yamada | G11B 20/1217 |
| 2017/0263279 A1* | 9/2017 | Yamada | G11B 20/1217 |
| 2018/0315447 A1* | 11/2018 | Yamada | G11B 20/1217 |

* cited by examiner

INFORMATION RECORDING MEDIUM AND REPRODUCTION DEVICE

TECHNICAL FIELD

The present invention relates to (i) an information recording medium in which information can be recorded and (ii) a playback device capable of playing back the information recording medium.

BACKGROUND ART

In order to store large amounts of data such as a high image quality video, there has recently been a demand for a large-capacity information recording medium. A high-density information recording medium that is expected to satisfy such a demand is exemplified by a super-resolution medium (i) in which content information is recorded by a pit group including a pit that is shorter in length than an optical system resolution limit and (ii) which is played back by higher playback power than normal.

In order to ensure compatibility between information recording mediums, an information recording medium is generally provided with not only a data region (i.e., a region in which content is recorded) but also a medium information region (i.e., a region in which information for identifying a type of an information recording medium is recorded). By playing back the medium information region, a playback device reads information that is necessary for playing back the data region. Subsequently, the playback device plays back the data region.

As in the case of a normal medium (i.e., a non-super-resolution medium), a super-resolution medium is also provided with a medium information region and a data region that are identical in recording density. Against a background of this, there have been proposed various methods for responding to an increase in total number of clusters due to an increase in recording density.

Patent Literature 1 discloses a method for recording address information in each of a medium information region and a data region of a super-resolution medium by use of an address data format which differs from that of a normal medium. (b) of FIG. 15 illustrates an address data format of a super-resolution medium disclosed in Patent Literature 1. (a) of FIG. 15 illustrates an address data format of a normal medium disclosed in Patent Literature 1.

CITATION LIST

Patent Literature

[Patent Literature 1]
Japanese Patent Application Publication Tokukai No. 2010-262713 (Publication date: Nov. 18, 2010)

SUMMARY OF INVENTION

Technical Problem

However, playback of an information recording medium via a conventional playback device capable of playing back both a super-resolution medium and a normal medium (i.e., a playback device having downward playback compatibility) causes the following problems.

Specifically, assume that an address data format which differs from that of a normal medium (i.e., an address data format for a super-resolution medium) is applied to not only the data region but also the medium information region of the super-resolution medium as in the method disclosed in Patent Literature 1. In this case, since a type of a medium is unknown when the medium information region of an information recording medium starts to be played back via a playback device, it is necessary to assume a case where the information recording medium to be played back is a normal medium that is inadaptable to higher playback power for playing back a super-resolution medium. This requires the playback device to start playing back the information recording medium by use of a normal medium playback setting (i.e., lower playback power, a normal medium error correction method, etc.).

FIG. 16 is a flowchart showing an example of how a conventional playback device plays back an information recording medium. After a normal medium playback setting has been selected (process S101), a playback device attempts to playback a medium information region (process S102). Then, in a case where the medium information region is improperly played back ("NO" at S102), the playback device determines that the information recording medium to be played back is a super-resolution medium, selects a super-resolution medium playback setting (process S104), and plays back a data region (process S105). Meanwhile, in a case where the medium information region is properly played back ("YES" at S102), the playback device determines that the information recording medium to be played back is a normal medium, and plays back the data region without changing the normal medium playback setting (process S103).

However, according to the process shown in FIG. 16, even in a case where a normal medium having a medium information region that cannot be played back properly due to some reason such as dirt on that medium is loaded in a playback device, the playback device also determines that the normal medium is a super-resolution medium.

This is because according to a conventional playback device, an inability to play back the medium information region is a criterion for determining that the information recording medium is a super-resolution medium.

Thus, it is expected that, despite the fact that the information recording medium to be played back is a normal medium, a super-resolution medium playback setting will be applied to the normal medium and a medium information region of the normal medium will be irradiated with playback light having higher playback power for playing back a super-resolution medium.

However, a normal medium, which has no durability to withstand playback light having higher playback power for playing back a super-resolution medium, may be broken when irradiated with such playback light.

Thus, due to some reason such as adhesion of dirt to the information recording medium, the playback device loses its downward compatibility. This causes a problem of a fear of breakage by mistake of a normal medium that essentially has no problem.

The present invention has been made so as to solve the above problems, and an object of the present invention is to provide an information recording medium suitable for a playback device to carry out playback with higher reliability.

Solution to Problem

In order to attain the above object, the information recording medium according to an aspect of the present invention is an information recording medium including: a first region in which type identification information for identifying a type of the information recording medium is recorded by recesses and/or protrusions which are formed by a given modulation method and whose lengths are longer than a length of an optical system resolution limit of a playback device; and a second region in which content data is recorded by recesses and/or protrusions which are formed by the given modulation method and which include a recess and/or a protrusion whose length is shorter than the length of the optical system resolution limit, the first region containing first address information recorded therein in a first address data format, and the second region containing second address information recorded therein in a second address data format that differs from the first address data format.

Advantageous Effects of Invention

The information recording medium according to an aspect of the present invention yields an effect of providing an information recording medium suitable for a playback device to carry out playback with higher reliability.

DESCRIPTION OF EMBODIMENTS

Embodiment 1

Embodiment 1 of the present invention will be described below with reference to FIGS. 1 through 7.

(Configuration of Optical Disk 100)

Figure 1:
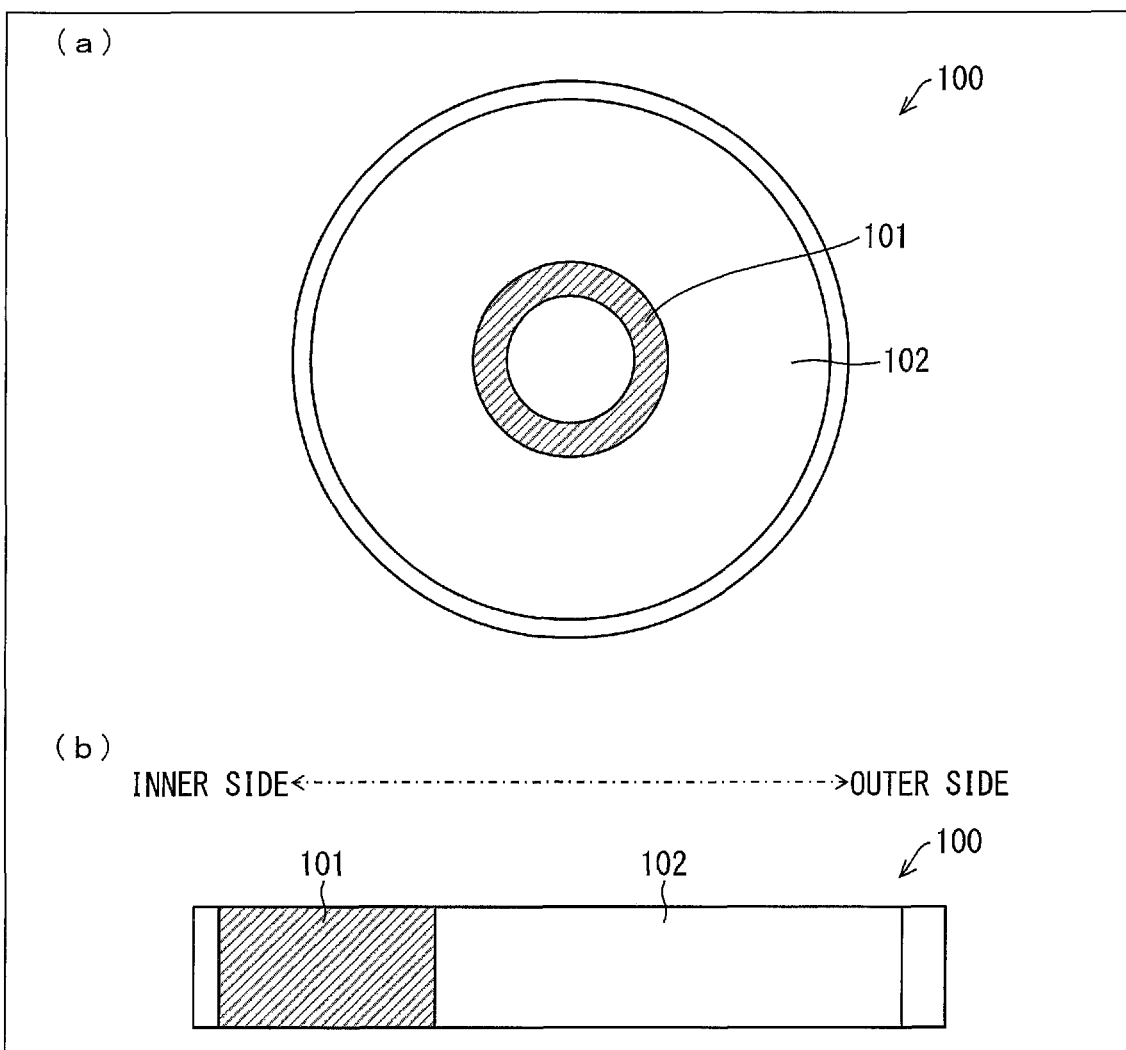
FIG. 1 is a set of views (a) and (b). (a) of FIG. 1 is a plan view showing an example of a configuration of an optical disk according to Embodiment 1 of the present invention, and (b) of FIG. 1 is a cross-sectional view showing an example of a configuration of recording layers of the optical disk.

The following description discusses, with reference to FIG. 1, a configuration of an optical disk 100 (information recording medium). (a) of FIG. 1 is a plan view showing an example of a configuration of the optical disk 100, and (b) of FIG. 1 is a cross-sectional view showing an example of a configuration of recording layers of the optical disk 100. Note that Embodiment 1 discusses a case where the optical disk 100 is a read-only Blu-ray (registered trademark) Disc (BD).

The optical disk 100, which is a discoid super-resolution medium, has (i) a medium information region 101 (first region) in which information on the optical disk 100 is recorded and (ii) a data region 102 (second region) in which content such as video or software is recorded.

In the medium information region 101 and the data region 102, (i) information on the optical disk 100 and (ii) content (content data), respectively, are recorded by a given modulation method (e.g., the 1-7 PP (Parity Preserve/Prohibit RMTR (Repeated Minimum Translation Run Length)) modulation recording method) by marks and spaces constituted by pit groups.

Specifically, information on the optical disk 100 is recorded in the medium information region 101 in a form of pits of the medium information region 101, and content is recorded in the data region 102 in a form of pits of the data region 102.

For example, in the case of a BD, the 1-7PP modulation recording method is used, and thus information on the optical disk 100 and content are recorded by marks and spaces of 2T through 8T.

The medium information region 101 is provided in an innermost part (so-called "lead-in region") of the optical disk 100. In the medium information region 101, pieces of information such as medium identification information (type identification information) and management information for recorded data are recorded as information on the optical disc 100 by a pit group made up only of pits longer than an optical system resolution limit (described later) (0.119 μm). The medium information region 101 is identical in recording density to a normal medium.

The medium identification information is information for identifying a type of an information recording medium. The medium identification information includes, for example, disk type identification information such as a type of the optical disk 100 (BD, DVD, read-only, write-once, rewritable, etc.) and a storage capacity of the optical disk 100, and individuality identification information for identifying each individual optical disk 100. The management information is information indicative of, for example, an address at which a piece of information is recorded, and a relationship among a plurality of pieces of information.

The data region 102 is provided in the optical disk 100 so as to be outer than the medium information region 101. In the data region 102, content (i.e., information to be used by a user) is recorded by the 1-7PP modulation recording method by a pit group including a pit that is shorter than the optical system resolution limit. Thus, the data region 102 is higher in recording density than the medium information region 101.

Assuming that a wavelength of playback light of a playback device suited to the optical disk 100 is $\lambda$ and a numerical aperture is NA, an optical system resolution limit of the playback device is expressed as $\lambda/(4\times NA)$. According to the optical disk 100, the optical system resolution limit is expressed as $\lambda/(4\times NA)=0.119$ μm where $\lambda=405$ (nm) and NA=0.85.

Figure 2:
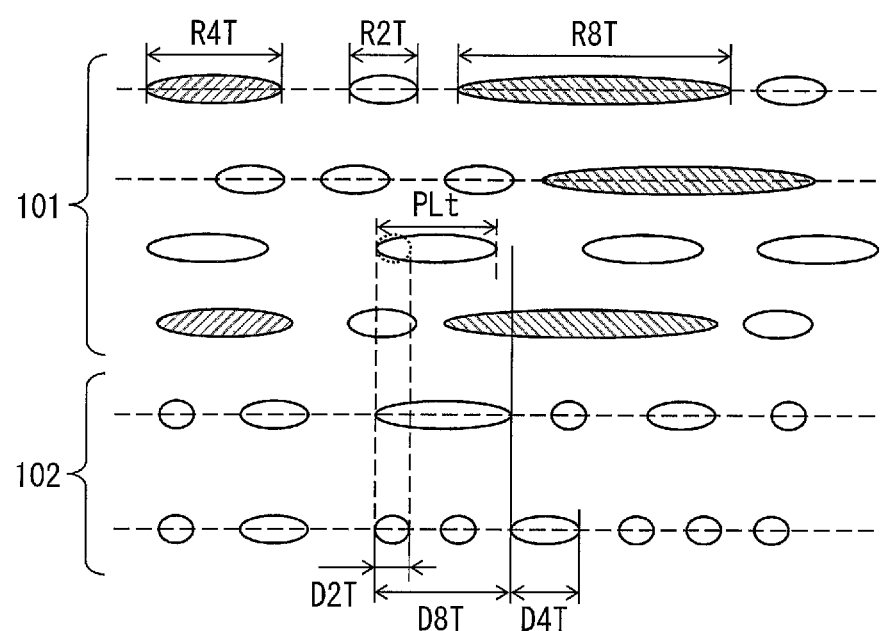
FIG. 2 is an enlarged view of a boundary part between a medium information region and a data region of the optical disk of Embodiment 1 of the present invention.

FIG. 2 is an enlarged view of a boundary part between the medium information region 101 and the data region 102 of the optical disk 100. According to the optical disk 100, in which various pieces of information are recorded by the 1-7 PP modulation recording method, the medium information region 101 has a minimum pit length, which is a 2T pit length (i.e., R2T), of 0.149 μm, and the data region 102 has a minimum pit length, which is a 2T pit length (i.e., D2T), of 0.112 μm.

Note that a "pit length" means a length of a pit that is formed of a recess and/or protrusion, and generally means a length in a circumferential direction of the optical disk 100.

Further, a track pitch of a track formed by a pit group in the medium information region 101 and a track pitch of a track formed by a pit group in the data region 102 are equal to each other (e.g., 0.35 μm). Note that a track pitch is a distance between two adjacent tracks in a radial direction of the optical disk 100.

Figure 3:
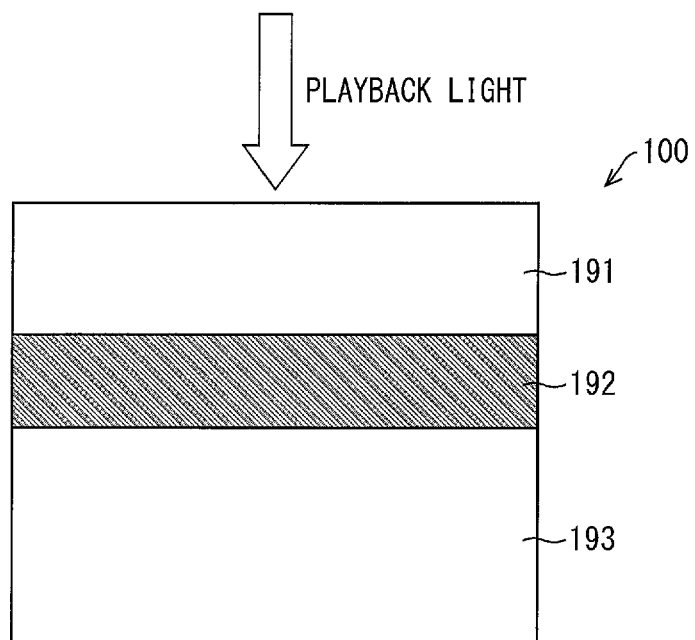
FIG. 3 is a view schematically illustrating a cross section of the optical disk of Embodiment 1 of the present invention.

FIG. 3 is a view schematically illustrating a cross section of the optical disk 100. The optical disk 100 includes a cover layer 191, a functional layer 192, and a substrate 193 that are provided in this order from a side on which playback light supplied from a playback device is incident.

The cover layer 191 is made of, for example, an ultraviolet curable resin having a thickness of 100 μm. The cover layer 191 which is made of such an ultraviolet curable resin has a refractive index of approximately 1.5 with respect to playback light having a wavelength $\lambda=405$ nm.

Note that the cover layer 191 can be made of any material that has a high transmissivity with respect to a wavelength $\lambda$ of playback light. Thus, a material of which the cover layer 191 can be made is exemplified by, but not particularly limited to, a combination of a polycarbonate (PC) film and a transparent adhesive.

The substrate 193 is made of, for example, polycarbonate having a diameter of 120 mm and a thickness of 1.1 mm. On the substrate 193, information is recorded by pits which are constituted by recesses and/or protrusions provided on a surface of the substrate 193 which surface is located on a side on which playback light is incident.

Note that the substrate 193 can be made of any material that has a surface on which information can be recorded by pits constituted by recess and/or protrusions and which is located on a side on which playback light is incident. Thus, the substrate 193 can be made of, for example, polycarbonate resin and acrylic resin (PMMA), polyester, alicyclic hydrocarbon resin, epoxy acetal synthetic resin, or glass. A material of which the substrate 193 is made is not particularly limited, provided that the material can meet standards of a strength and a flatness that are required of a substrate.

The functional layer 192 is made of, for example, Ta having a thickness of 12 nm. The functional layer 192 is a film that allows a playback optical system to read information recorded by a prepit group provided on a surface of the substrate 193. Note that the "prepit group" means a plurality of irregularities provided on the substrate 193.

That is, the functional layer 192 can be any super-resolution film which allows a playback optical system to carry out playback (i.e., super-resolution playback) even in a case where an average of lengths of a minimum pit and a minimum space, which are provided in the pit group, is smaller than the optical resolution limit. The functional layer 192 can be formed by, for example, sputtering.

The functional layer 192 can be made of, for example, a material such as Si, Ge, GeSbTe, AgInSbTe, Al, Ag, Au, or Pt, or a mixture of these materials (e.g., APC).

Furthermore, the functional layer 192 can be made of a stack of two or more types of films. The functional layer 192 can be made of, for example, a stack of (i) a light absorption film having a thickness of 8 nm and made of a material such as Ta, Al, Ag, Au, or Pt, or a mixture of these materials and (ii) a super-resolution playback film made of a material such as ZnO, $CeO_2$, or $TiO_2$. The functional layer 192 which is made of the light absorption film and the super-resolution playback film allows playback of information also in a case where the optical disk 100 has a higher recording density.

Further, the functional layer 192 can include two or more layers. The functional layer 192 which includes two or more layers only needs to be provided with an intermediate layer located between respective functional layers of the functional layer 192.

The intermediate layer can be made of, for example, an ultraviolet curable resin. The intermediate layer can be made of any material (i) that has a high transmissivity with respect to a wavelength $\lambda$ of playback light and (ii) that has a surface on which content can be recorded by pits constituted by recesses and/or protrusions and which is located on a side on which playback light is incident.

Note that, in a case where the functional layer 192 includes two or more layers, the medium information region 101 needs to be provided in an inner part of at least one of the functional layers of the functional layer 192. This allows the data region 102 to be larger, and enables the optical disk 100 to have a greater capacity.

The medium information region 101 does not necessarily need to be provided in the innermost part of the optical disk 100. Alternatively, the medium information region 101 can be provided in an outer part (so-called "lead-out region") of the optical disk 100.

(Configuration of Address Data)

According to Embodiment 1, embossed pits (i.e., recesses and/or protrusions) formed on the substrate 193 cause address information (address data) to be recorded in each of the medium information region 101 and the data region 102. Specifically, address information is recorded in each of the medium information region 101 and the data region 102 by the modulation method (described earlier) by marks and spaces constituted by pit groups.

Figure 4:
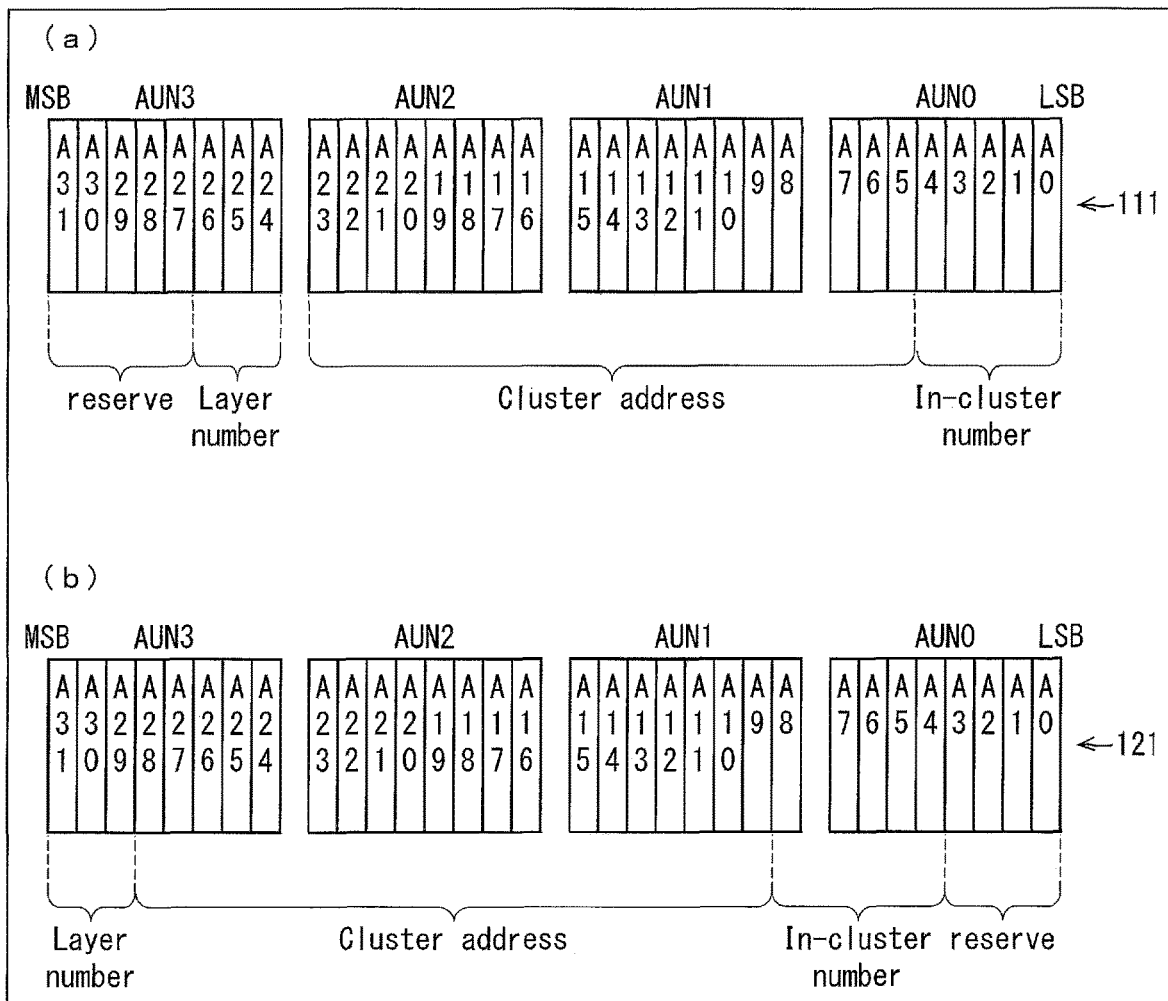
FIG. 4 is a set of views (a) and (b). (a) of FIG. 4 is a view showing an example of a structure of an address unit number used in the medium information region of the optical disk of Embodiment 1 of the present invention, and (b) of FIG. 4 is a view showing an example of a structure of an address unit number used in the data region of the optical disk.
Figure 5:
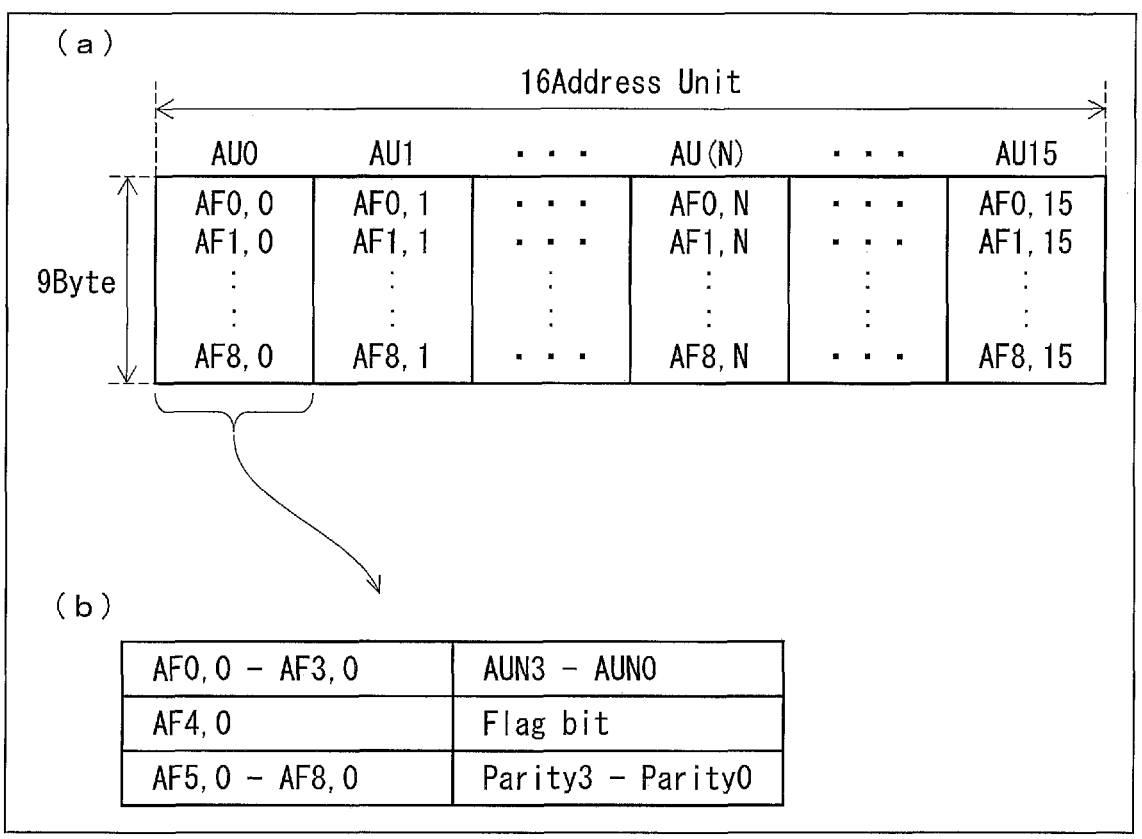
FIG. 5 is a set of views (a) and (b). (a) of FIG. 5 is a view showing an example of a structure of an address unit group of the optical disk of Embodiment 1 of the present invention, and (b) of FIG. 5 is a view showing an example of a structure of an address unit "AU0", which is one of address units of the address unit group.
Figure 6:
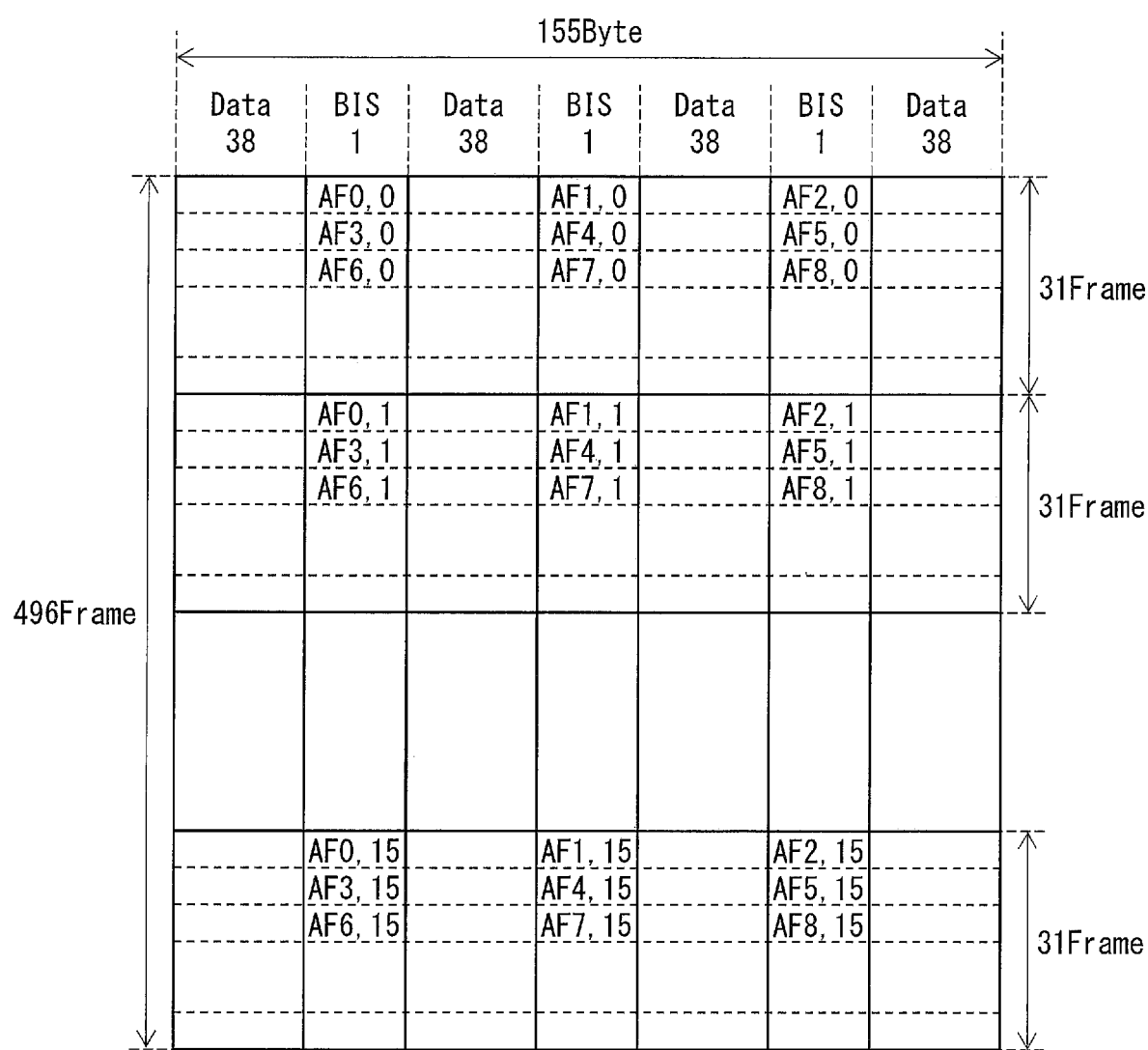
FIG. 6 is a view illustrating a structure of a main data block (cluster) of the optical disk of Embodiment 1 of the present invention, in which main data block main data is recorded, and an example of an arrangement of address units (address fields) in the main data block.

The following description discusses, with reference to FIGS. 4 through 6, (i) an example of structures of address unit numbers (AUN) (AUN structures) of each of the medium information region 101 and the data region 102, in each of which address information is stored, and (ii) an example of a structure of an address unit (AU) including the address unit numbers.

First, the example of the structures of the address unit numbers (AUN) is described below with reference to FIG. 4. FIG. 4 is a set of views which set shows the example of the structures of the address unit numbers. (a) of FIG. 4 is a view showing an example of a structure of an address unit number 111 used in the medium information region 101 of the optical disk 100, and (b) of FIG. 4 is a view showing an example of a structure of an address unit number 121 used in the data region 102 of the optical disk 100. Note that among the address unit numbers, "AUN0" is the least significant symbol and "AUN3" is the most significant symbol.

As with the address unit numbers, among types of parity, which are described later and are illustrated in (b) of FIG. 5, "Parity0" is the least significant symbol, and "Parity3" is the most significant symbol.

As illustrated in (a) of FIG. 4, the medium information region 101 is provided with "AUN0" through "AUN3" as an address unit number 111 having 4 symbols (1 symbol=8 bits). That is, "AUN0" through "AUN3" are each constituted by 1 symbol (8 bits), and these 4 symbols are indicated by bits A0 through A31. The bits A0 through A31 which constitute the address unit number 111 function as below.

Bits A0 through A4 (5 bits) are each an in-cluster number. A cluster is a unit of data recording. In the case of a recordable disk, the cluster is a unit constituting 1 RUB (recording unit block: recording playback cluster).

Bits A5 through A23 (19 bits) are each a cluster address.

Bits A24 through A26 (3 bits) are each a layer number (recording layer number).

Bits A27 through A31 (5 bits) are reserve bits.

The address unit number 111 employed in the medium information region 101 is identical to that employed in a normal medium (i.e., a non-super-resolution medium).

As illustrated in (b) of FIG. 4, the address unit number 121 of the data region 102 also has 4 symbols which constitute respective "AUN0" though "AUN3" indicated by bits A0 through A31. The bits A0 through A31 which constitute the address unit number 121 function as below.

Bits A0 through A3 (4 bits) are reserve bits.

Bits A4 through A8 (5 bits) are each an in-cluster number.

Bits A9 through A28 (20 bits) are each a cluster address.

Bits A29 through A31 (3 bits) are each a layer number.

Since the data region 102 has a high recording density than a normal medium, the cluster addresses (i.e., bits A5 through A23 (19 bits)) of the address unit number 111 used in the medium information region 101 can be said to be insufficient to express the cluster addresses (i.e., bits A9 through A28 (20 bits)) of the address unit number 121 used in the data region 102.

Thus, according to the data region 102, assuming that the bits A9 through A28 (20 bits) are the cluster addresses of the address unit number 121, the cluster addresses of the address unit number 121 are increased by 1 bit as compared with those of the address unit number 111 of the medium information region 101 (see (b) of FIG. 4). This solves the problem of insufficiency of cluster addresses in the data region 102.

Note that the address unit number 121, whose structure is not limited to the structure described above, only needs to have any structure in which the cluster addresses of the address unit number 121 are greater in number of bits than those of the address unit number 111.

As described earlier, the address unit number 111 used in the medium information region 101 (first address data format (address method)) has a data structure which is identical to a data structure of an address unit number used in an information recording medium (i.e., a normal medium) constituted by recesses and/or protrusions whose lengths are longer than that of the optical system resolution limit of a playback device.

Meanwhile, the address unit number 121 used in the data region 102 (second address data format) has a data structure which differs from a data structure of the address unit number 111 used in the medium information region 101 and which further enables recording of denser data than a normal medium.

Thus, in the medium information region 101, address information is recorded in the first address data format, which is identical to that of a normal medium. Meanwhile, in the data region 102, address information is recorded in the second address data format, which differs from the first address data format and which further enables recording of denser data than a normal medium (e.g., a data structure in which the cluster addresses are greater in number of bits (number of addresses) than those of a normal medium).

In other words, since pieces of information are recorded in the address unit number 111 and the address unit number 121 in respective different address data formats, the address unit number 111 and the address unit number 121 differ in structure.

Here, an error correction code (ECC) encoding process is carried out with respect to each of the address unit number 111 and the address unit number 121 in address units illustrated in FIG. 5. (a) of FIG. 5 is a view showing an example of a structure of an address unit group, and (b) of FIG. 5 is a view showing an example of a structure of an address unit "AU0", which is one of address units of the address unit group. Note that a method that can be used to carry out the ECC encoding with respect to main data is either one of a long distance code (LDC) method and a burst indicator subcode (BIS) method.

(a) of FIG. 5 shows, as the example of the structure of the address unit group, a case where 16 address units of "AU0" through "AU15" are provided. In this case, the address units "AU0" through "AU15" are configured as below.

Address unit "AU0" is constituted by 9 bytes of address fields "AF0,0" through "AF8,0". That is, 1 address field is composed of 1 byte (1 symbol).

Address unit "AU1" is constituted by 9 bytes of address fields "AF0,1" through "AF8,1".

Similarly, the address units "AU2" through "AU15" are each constituted by 9 bytes. That is, the Nth "AU(N)" is constituted by 9 bytes of "AF0,N" through "AF8,N".

The ECC encoding is carried out with respect to these address units each having 9 bytes (i.e., for each of "AU0" through "AU15"). The address units used in the medium information region 101 each include the address unit number 111, a flag bit, and the types of parity. Similarly, the address units used in the data region 102 each include the address unit number 121, the flag bit, and the types of parity.

Specifically, an address unit is a data group that is provided so as to include at least (i) address information indicative of an address of data (recorded data) recorded on the optical disk 100 or an address of data (playback data) to be read out from the optical disk 100, and (ii) identification data that enables given encoding or decoding of the address information for error correction in a playback device suited to the optical disk 100.

The address unit numbers each serve as the address information (described earlier). That is, each of the address unit numbers is data indicative of an address assigned to recorded data or playback data. The types of parity include the identification data (described earlier). That is, the types of parity include data that enables error correction to the address units. The flag bit includes data indicative of a state in which recorded data is recorded. That is, the flag bit records therein, for example, information indicative of a state in which recorded data is recorded. Note that the flag bit can be used as a reserve region in a read-only disk.

(b) of FIG. 5 illustrates the address unit "AU0".

Address unit numbers of "AUN3", "AUN2", "AUN1", and "AUN0" are assigned to respective address fields "AF0,0", "AF1,0", "AF2,0", and "AF3,0" of the address unit "AU0".

The flag bit is assigned to an address field "AF4,0".

The types of parity (Parity3 through Parity0) are assigned to respective address fields "AF5,0" through "AF8,0".

The address units "AU1" through "AU15" are each identical in structure to the address unit "AU0." Thus, in the Nth address unit "AU(N)",
- address unit numbers "AUN3" through "AUN0" of "AU(N)" are assigned to respective address fields "AF0,N" through "AF3,N",
- the flag bit is assigned to an address field "AF4,N", and
- the types of parity (Parity3 through Parity0) are assigned to respective address fields "AF5,N" through "AF8,N".

The error correction carried out by the ECC encoding for each of the address units is arranged such that, in a case where 9 symbols of each of the address units include 4 symbols that are assigned to respective types of parity, errors that occur within 2 symbols of the 9 symbols can be corrected.

Thus, error correction encoding data to be formed as an address unit is a Reed-Solomon (RS) code having RS (9, 5, 5), a code length 9, data 5, and a distance 5.

In other words, the medium information region 101 of the optical disk 100 has address units that include the address unit number 111 whose (9, 5, 5) RS code has been subjected to an error correction encoding process. The data region 102 of the optical disk 100 has address units that include the address unit number 121 whose (9, 5, 5) RS code has been subjected to the error correction encoding process.

FIG. 6 is a view illustrating a structure of a main data block (cluster) in which main data is recorded and an example of an arrangement of address units (address fields) in the main data block. Note that information which is recorded, on tracks provided on each recording layer, by a phase change mark, a pigmentary change mark, or an embossed pit row is referred to as "main data (user data)".

As illustrated in FIG. 6, a single main data block is composed of 496 frames. That is, a single cluster is composed of 496 frames. Those frames each have a 155-byte structure in which data (38 bytes), BIS (1 byte), data (38 bytes), BIS (1 byte), data (38 bytes), BIS (1 byte), and data (38 bytes) are arranged.

That is, a single frame is composed of 152 bytes (=38 bytes×4) of data and 3 bytes (=1 byte×3) of BIS, each of which is provided every 38 bytes of data. In this main data block having 496 frames, the address units "AU0 (Address Unit0)" through "AU15 (Address Unit15)" are arranged in respective 31-frame units.

Specifically, 3 address fields are assigned to respective first 3 frames of each 31-frame group, which first 3 frames constitute BIS, so that the address units "AU0" through "AU15", each of which is composed of 9 bytes (9 symbols), are arranged in the main data block. Thus, as illustrated in FIG. 6, the address units are arranged as below.

The address fields "AF0,0" through "AF8,0", each of which has 1 byte (which have 9 bytes in total) and which constitute the address unit "AU0", are arranged in the first 3 frames (which constitute BIS) of the first 31-frame group of the main data block.

The address fields "AF0,1" through "AF8,1", which constitute the address unit "AU1", are arranged in the first 3 frames (which constitute BIS) of the second 31-frame group of the main data block.

Similarly, the address units "AU2" through "AU15" are arranged in the respective 3rd through 16th 31-frame groups.

As described earlier, the address units including the address unit number 111 are assigned to BIS of a main data block of the medium information region 101, and the address units containing the address unit number 121 are assigned to BIS of a main data block of the data region 102. That is, BIS includes the address information. In other words, BIS contributes to encoding of the address information.

(Effect of Optical Disk 100)

In a pit group of the medium information region 101 of the optical disk 100, recesses and/or protrusions whose lengths are longer than that of the optical system resolution limit of a playback device (i.e., longer than 0.119 µm) are formed by a given modulation method. In a pit group of the data region 102, recesses and/or protrusions including a recess and/or a protrusion whose length is shorter than that of the optical system resolution limit of a playback device are formed by the given modulation method.

Further, in the medium information region 101, address information is recorded in the first address data format (i.e., an address data format identical to that of a normal medium), and in the data region 102, address information is recorded in a second address data format.

Thus, by irradiating the medium information region 101 with playback light having normal medium playback power, it is possible to read out (i) the address information and (ii) information on the optical disk 100 (in particular, medium identification information) that are recorded in the medium information region 101.

This allows a playback device to use successful playback of the medium information region 101 as a criterion for determining that the optical disk 100 to be played back is a super-resolution medium. Especially in a case where the optical disk 100 is to be played back via a playback device 1 of Embodiment 2 (described later), a region different from the data region 102 of the optical disk 100 will not be irradiated with playback light having super-resolution playback power.

That is, neither a normal medium nor the medium information region 101 of the optical disk 100 will be irradiated with the playback light having super-resolution playback power. Note that, since address information is recorded in the data region 102 in the second address data format (described earlier), it is possible to read out, from the data region 102, the address information and content by use of the playback light having super-resolution medium playback power.

Thus, the optical disk 100 used as a super-resolution medium makes it possible to prevent the playback device 1 of Embodiment 2 from erroneously determining that a normal medium is a super-resolution medium. This makes it possible to prevent the occurrence of a situation in which a normal medium that is irradiated with playback light having greater playback power for playing back a super-resolution medium is broken.

Thus, in a case where the optical disk 100 is to be played back by the playback device 1 of Embodiment 2, it is possible to yield an effect of enabling playback of an information recording medium with higher reliability. In other words, it is possible to provide the optical disk 100 as a super-resolution medium that is suitable to be played back by the playback device 1 of Embodiment 2.

In addition, the optical disk 100, in which the address data format of the data region 102 has been replaced with a format for a high density information recording medium (i.e., the second address data format), also yields an effect of having a greater storage capacity without insufficiency of addresses.

Embodiment 2

Embodiment 2 of the present invention will be described below with reference to FIGS. 7 through 9. Note that, for convenience, members having functions identical to those of the respective members described in Embodiment 1 are given respective identical reference numerals, and a description of those members is omitted in Embodiment 2.

(Configuration of Playback Device 1)

Figure 7:
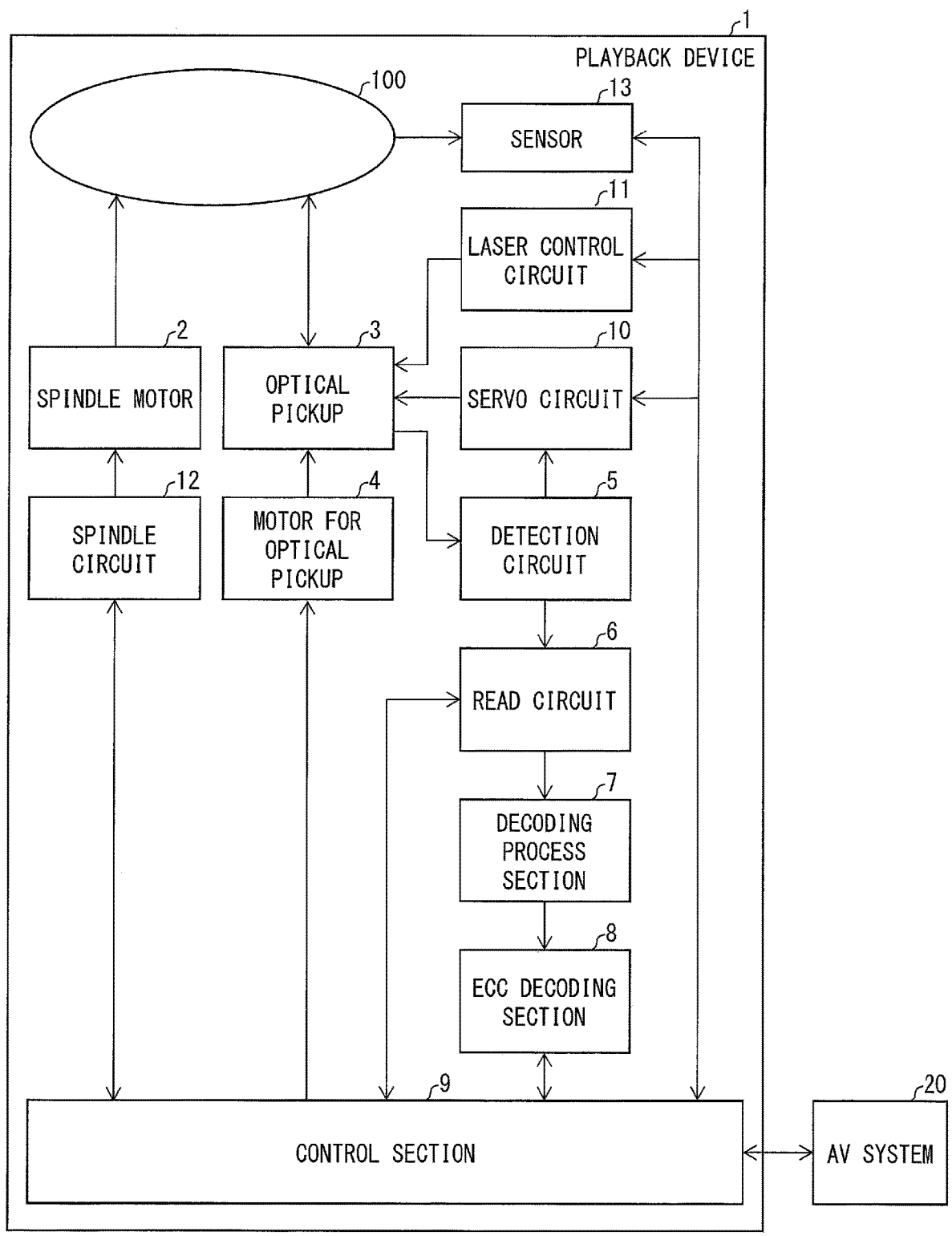
FIG. 7 is a block diagram illustrating a configuration of a playback device of Embodiment 2 of the present invention.

The following description discusses, with reference to FIG. 7, a configuration of a playback device 1 for playing back the optical disk 100 of Embodiment 1. FIG. 7 is a block diagram illustrating the configuration of the playback device 1.

The playback device 1 is a playback device capable of playing back both a super-resolution medium and a normal medium. That is, it is possible to apply, to the playback device 1, not only a playback setting for playing back a super-resolution medium (i.e., a setting of playback light having higher power) but also a playback setting for playing back a normal medium (i.e., a setting of playback light having lower power). The following description refers to such a playback device as a playback device having downward playback compatibility.

Note that, though Embodiment 2 discusses a case where the playback device 1 is loaded with the optical disk 100 (i.e., a super-resolution medium), the playback device 1 can also be loaded with a normal medium.

The playback device 1 includes a spindle motor 2, an optical pickup 3, a motor 4 for the optical pickup 3, a detection circuit 5, a read circuit 6, a decoding process section 7, an ECC decoding section 8, a control section 9, a servo circuit 10, a laser control circuit 11, a spindle circuit 12, and a sensor 13. The playback device 1 is connected to an audio visual (AV) system 20 that is externally provided.

By detecting that chucking of the optical disk 100 has been carried out with respect to a turntable (not illustrated) of the playback device 1, the sensor 13 detects that the playback device 1 is loaded with the optical disk 100. Then, the sensor 13 supplies, to the control section 9, information indicating that the playback device 1 is loaded with the optical disk 100.

The control section 9 which has obtained the information from the sensor 13 instructs the spindle circuit 12 to rotate the spindle motor 2. Then, the control section 9 instructs the motor 4 to move the optical pickup 3 to a given position. The motor 4 is a drive mechanism for moving the optical pickup 3 to a given reading position. The control section 9 has a function of collectively controlling operations of sections of the playback device 1.

While moving in a radial direction of the optical disk 100 which is rotating, the optical pickup 3 irradiates the optical disk 100 with laser light serving as playback light. The optical pickup 3 which has received a drive signal (drive current) supplied from the laser control circuit 11 is driven to emit the laser light. Note here that the operation of the laser control circuit 11 is controlled by the control section 9.

The playback device 1 plays back the optical disk 100 by use of reflected light resulting from laser light reflected by the optical disk 100. In order to play back the optical disk 100, the optical pickup 3 includes a laser diode, an object lens, and a photodetector, which are not illustrated.

The laser diode outputs laser light. The optical disk 100 is irradiated with the laser light via the object lens. Then, light reflected by the optical disk 100 is detected by the photodetector.

The laser light outputted by the laser diode is, for example, laser light having a wavelength of $\lambda=405$ nm. Further, the object lens has a numerical aperture of, for example, NA=0.85. Note that the wavelength and the numerical aperture are not limited to these, and can be any wavelength and any numerical aperture each of which is specified in accordance with a type or a class of the optical disk 100.

The reflected light detected by the photodetector of the optical pickup 3 is supplied, in a form of a playback signal, to the detection circuit 5. The detection circuit 5 generates not only the playback signal (i.e., a radio frequency (RF) signal) but also a focus error signal and a tracking error signal.

The detection circuit 5 supplies the focus error signal and the tracking error signal to the servo circuit 10. The servo circuit 10 controls, in accordance with the focus error signal and the tracking error signal, the operation of an actuator (not illustrated) of the optical pickup 3 so that the laser light follows data tracking of the optical disk 100.

The detection circuit 5 also supplies the playback signal to the read circuit 6. The read circuit 6 generates a playback clock from the playback signal by use of a phase locked loop (PLL) (not illustrated). The read circuit 6 also carries out a demodulation process with respect to run length limited (RLL) (1, 7) modulation so as to demodulate the playback signal.

The read circuit 6 supplies, to the decoding process section 7, a playback clock signal and a result of the demodulation of the playback signal. The decoding process section 7 decodes an address by use of the result of demodulation of the playback signal.

Figure 8:
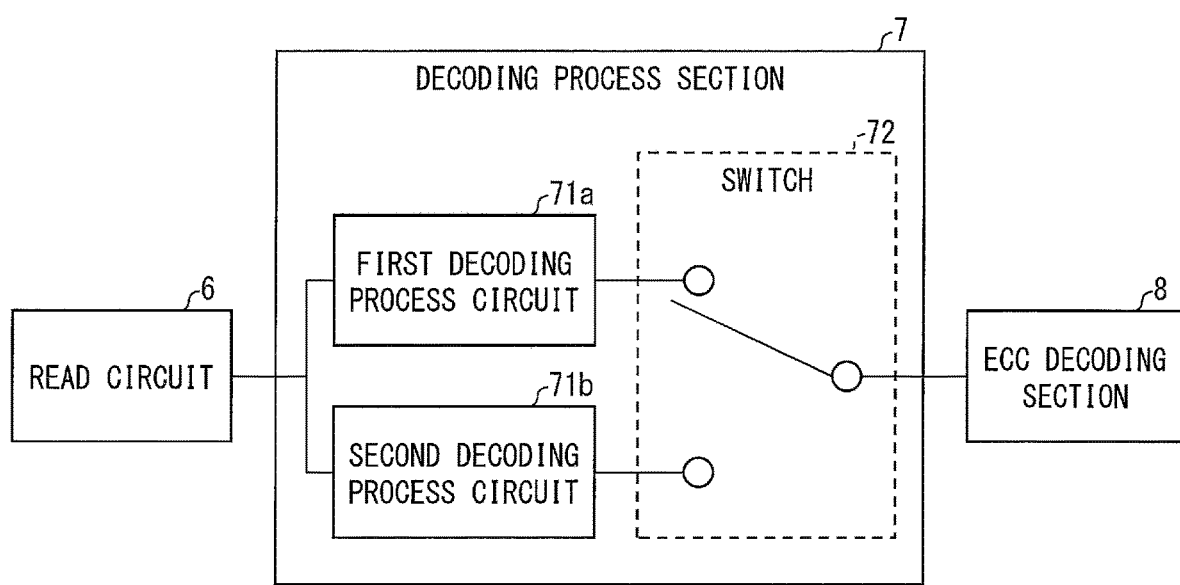
FIG. 8 is a view illustrating a specific configuration of a decoding process section of Embodiment 2 of the present invention.

FIG. 8 is a view illustrating a specific configuration of the decoding process section 7. The decoding process section 7 includes a first decoding process circuit 71a (first address information decoding process section), a second decoding process circuit 71b (second address information decoding section), and a switch 72.

The first decoding process circuit 71a and the second decoding process circuit 71b are each connected to the read circuit 6. The switch 72 is connected to each of the first decoding process circuit 71a and the second decoding process circuit 71b on its input side, and is connected to the ECC decoding section 8 on its output side.

The first decoding process circuit 71a has a function of decoding address information recorded in a first address data format. The second decoding process circuit 71b has a function of decoding address information recorded in a second address data format.

Thus, the first decoding process circuit 71a can decode not only address information of a medium information region 101 but also address information of a medium information region of a normal medium and address information of a data region. Further, the second decoding process circuit 71b can decode address information of a data region 102. The switch 72 has a function of selecting an output to the ECC decoding section 8.

The read circuit 6 supplies, to each of the first and second decoding process circuits 71a and 71b of the decoding process section 7, the playback clock signal and the result of demodulation of the playback signal. Then, the first decoding process circuit 71a and the second decoding process circuit 71b each decode a corresponding piece of address information.

The address information obtained as a result of the decoding carried out by each of the first decoding process circuit 71a and the second decoding process circuit 71b is selected by the switch 72 in accordance with which of the regions (i.e., the medium information region 101 and the data region 102) of the optical disk 100 is to be played back by the playback device 1, and then is supplied to the ECC decoding section 8.

That is, the switch 72 is switched so that (i) the first decoding process circuit 71a which is carrying out its process is connected to the ECC decoding section 8, and (ii) the second decoding process circuit 71b which is carrying out its process is connected to the ECC decoding section 8. Note that the switch 72 causes a driver (not illustrated) of the decoding process section 7 to carry out the switching.

The ECC decoding section 8 carries out ECC decoding as a process for correcting an error. That is, the ECC decoding section 8 carries out the ECC decoding with respect to the address information supplied from the decoding process section 7, and generates a playback signal. Then, the ECC decoding section 8 supplies the playback signal to the control section 9.

As described earlier, the address data format (first address data format) of the medium information region 101 has the structure (AUN structure) of the address unit number 111 as illustrated in (a) of FIG. 4. The address data format (second address data format) of the data region 102 has the structure (AUN structure) of the address unit number 121 as illustrated in (b) of FIG. 4.

Thus, the ECC decoding section 8 carries out a decoding process that is in accordance with either of the address data formats. Thus, in a case where the ECC decoding section 8 incorrectly carries out this decoding process, the address information recorded in either of the address data formats will not be properly decoded. That is, in such a case, it is impossible to decode the address information.

Data included in the playback signal is decoded by the decoding process section 7 and by the ECC decoding section 8, and then is supplied to the AV system 20 via the control section 9.

FIG. 7 shows, as an example, a configuration in which the playback device 1 is connected to the AV system 20. Note, however, that an object to which the playback device 1 is to be connected is not limited to the AV system 20. The playback device 1 can also be connected to, for example, a personal computer.

Alternatively, the playback device 1 can be configured so as not to be connected to another device. In such a case, the playback device 1 includes, for example, an operation section and a display section, and an interface section for data input and output differs in configuration from that illustrated in FIG. 7. That is, the playback device 1 carries out recording and playback in accordance with a user's operation, and includes a terminal section for input and output of various data.

The spindle circuit 12 obtains, via the control section 9, the playback clock signal generated by the read circuit 6. By comparing the playback clock signal with a given rotation reference speed of the optical disk 100, the spindle circuit 12 generates a spindle error signal and a spindle drive signal that is in accordance with the spindle error signal.

Further, by supplying the spindle drive signal to the spindle motor 2, the spindle circuit 12 controls an operation of the spindle motor 2 so that the optical disk 100 is driven to rotate.

The spindle motor 2 can drive the optical disk 100 to rotate at a constant linear velocity (CLV) or at a constant angular velocity (CAV).

(Process Flow of Playback Operation of Playback Device 1)

Figure 9:
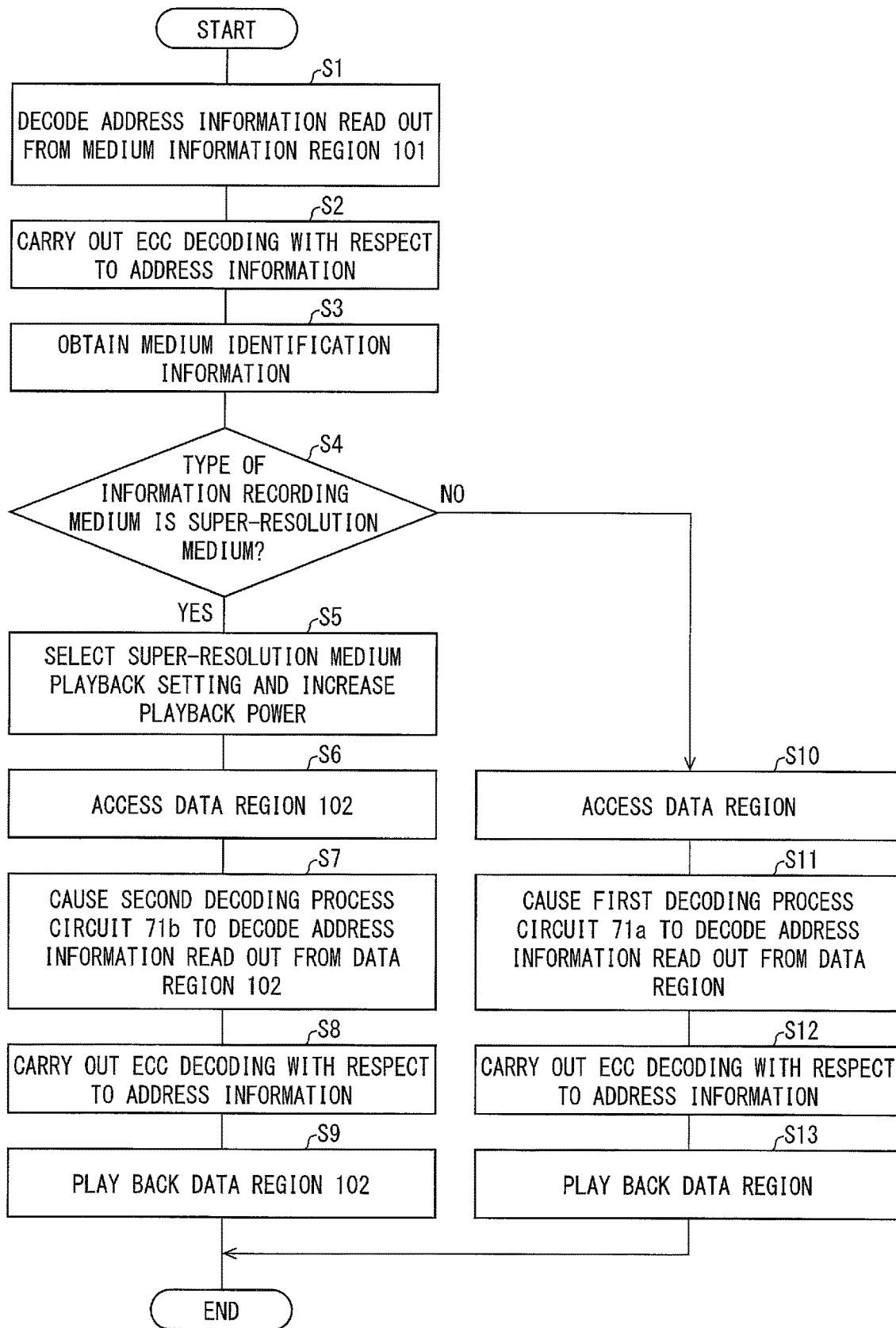
FIG. 9 is a flowchart showing an example of a flow of processes that the playback device of Embodiment 2 of the present invention carries out to play back an information recording medium.

FIG. 9 is a flowchart showing an example of a flow of processes that the playback device 1 carries out to play back an information recording medium (e.g., the optical disk 100). The following description discusses a case where an information recording medium to be played back is the optical disk 100.

By detecting that chucking of the optical disk 100 has been carried out with respect to a turntable (not illustrated) of the playback device 1, the sensor 13 detects that the playback device 1 is loaded with the optical disk 100.

The control section 9 which has obtained from the sensor 13 the information indicating that the playback device 1 is loaded with the optical disk 100 instructs the spindle circuit 12 to rotate the spindle motor 2. Further, the control section 9 instructs the motor 4 to move the optical pickup 3 to a given reading position.

Further, the control section 9 instructs the laser control circuit 11 to supply a drive signal (drive current) to the optical pickup 3. In accordance with this drive signal, the optical pickup 3 irradiates the medium information region 101 of the optical disk 100 with laser light serving as playback light and having normal medium playback laser power (e.g., low power of 0.35 mW). That is, a normal medium playback setting is set as a playback setting for playing back the medium information region 101 of the optical disk 100.

The optical pickup 3 which has received light reflected from the medium information region 101 generates a playback signal (RF signal). The playback signal is supplied from the optical pickup 3 via the detection circuit 5 and the read circuit 6 to the decoding process section 7 and the ECC decoding section 8. Processes S1 and S2 of FIG. 9 indicate respective operations, carried out by the decoding process section 7 and the ECC decoding section 8, for obtaining the address information of the medium information region 101.

The read circuit 6 (*i*) generates a playback clock from the playback signal by use of the PLL, and (ii) carries out a demodulation process with respect to the RLL (1, 7) modulation so as to demodulate the playback signal. The read circuit 6 supplies, to the decoding process section 7, the playback clock signal and a result of the demodulation of the playback signal.

The above description has discussed the operations that the playback device 1 carries out before carrying out the process S1 illustrated in FIG. 9. The following description will discuss processes S1 through S13 with reference to FIG. 9.

The decoding process section 7 causes the first decoding process circuit 71a (i.e., a decoding process circuit for decoding the address information recorded in the medium information region 101) to decode the address information read out from the medium information region 101 (process S1) (first address information decoding process step).

The process S1 makes it possible to obtain pieces of address information which pieces constitute the respective address units "AU0" through "AU15" illustrated in (a) of FIG. 4. That is, the process S1 makes it possible to obtain, as the pieces of address information, AUN0 through AUN3, flag data, and Parity0 through Parity3, which are 9 symbols constituting an address unit (AU).

The ECC decoding section 8 carries out, as a process for correcting errors in the address information, the ECC decoding with respect to each of the pieces of the address information obtained from the decoding process section 7 (process S2) (first ECC decoding step). The process S2 makes it possible to obtain the address information whose errors are corrected by the ECC decoding section 8.

In accordance with the address information obtained from the ECC decoding section 8, the control section 9 controls an operation of the motor 4 so that the motor 4 moves the optical pickup 3 to a given position in the medium information region 101. Then, the optical pickup 3 obtains medium identification information of the optical disk 100 from a given address of the medium information region 101 (process S3) (medium information obtaining step).

The control section 9 which refers to the medium identification information of the optical disk 100 which information has been obtained by the optical pickup 3 determines whether or not a type of an information recording medium loaded in the playback device 1 is a super-resolution medium (process S4) (medium type determination condition). For example, in a case where the information recording medium loaded in the playback device 1 is the optical disk 100, the control section 9 determines that the type of that information recording medium is a super-resolution medium.

The control section 9 which determines that the type of the information recording medium loaded in the playback device 1 is a super-resolution medium, (Yes at S4) selects, as a playback condition for playing back the data region 102, a super-resolution medium playback setting (process S5) (playback setting selecting step).

The super-resolution medium playback setting differs from the normal medium playback setting in, for example, playback power for playing back the optical disk 100, and linear velocity at which the optical disk 100 is driven to rotate. Note that the normal medium playback setting and the super-resolution medium playback setting can be recorded in advance in a recording device (not illustrated) of the playback device 1.

Further, Embodiment 2 uses the normal medium playback setting as an initial playback setting for the playback device 1. Thus, the normal medium playback setting is selected during a period from startup of the playback device 1 to the process S4.

The control section 9 controls an operation of the motor 4 so that the motor 4 moves the optical pickup 3 to a given position in the data region 102. Then, the optical pickup 3 irradiates the data region 102 with the playback light. That is, the optical pickup 3 accesses the data region 102 (process S6) (data region accessing step).

The optical pickup 3 receives light reflected from the data region 102, and generates the playback signal (RF signal). The following processes S7 and S8 indicate operations, carried out by the decoding process section 7 and the ECC decoding section 8, respectively, for obtaining address information recorded in the data region 102.

The read circuit 6 (i) generates a playback clock from the playback signal by use of the PLL, and (ii) carries out a demodulation process with respect to the RLL (1, 7) modulation so as to demodulate the playback signal. The read circuit 6 supplies, to the decoding process section 7, the playback clock signal and a result of the demodulation of the playback signal.

The decoding process section 7 causes the second decoding process circuit 71b (i.e., a decoding process circuit for decoding the address information recorded in the data region 102) to decode the address information read out from the data region 102 (process S7) (second address information decoding process step).

The process S7 makes it possible to obtain pieces of address information which pieces constitute the respective address units "AU0" through "AU15" illustrated in (b) of FIG. 4. That is, the process S1 makes it possible to obtain, as the pieces of address information, AUN0 through AUN3, flag data, and Parity0 through Parity3, which are 9 symbols constituting an address unit (AU).

The ECC decoding section 8 carries out, as a process for correcting errors in the address information, the ECC decoding with respect to each of the pieces of the address information obtained from the decoding process section 7 (process S8) (second ECC decoding step). The process S8 makes it possible to obtain the address information whose errors are corrected by the ECC decoding section 8

In accordance with the address information obtained from the ECC decoding section 8, the control section 9 controls an operation of the motor 4 so that the motor 4 moves the optical pickup 3 to a given position in the data region 102. Then, the optical pickup 3 obtains data of the optical disk 100 from a given address of the data region 102. That is, the optical pickup 3 plays back content recorded in the given address of the data region 102 (process S9) (data region playing back step).

A playback device plays back the optical disk 100 (i.e., super-resolution medium) by carrying out the above processes S1 through S9. Note that the processes S8 and S9 carried out with respect to the data region 102 are identical to the respective processes S2 and S3 carried out with respect to the medium information region 101.

Note that, in a case where an information recording medium to be played back is not the optical disk 100 but a normal medium, such an information recording medium is subjected to the following processes S10 through S13.

The control section 9 which determines that a type of an information recording medium loaded in the playback device 1 is not a super-resolution medium (NO at S4) continuously uses the normal medium playback setting (i.e., a playback condition identical to the playback condition for playing back the medium information region) also as the playback condition for playing back the data region.

Note that according to Embodiment 2, it is determined, also in a case where the medium information region is not played back, that a type of an information recording medium to be played back is not a super-resolution medium. Thus, in a case where (i) an information recording medium loaded in the playback device 1 is a normal medium and (ii) a medium information region of that information recording medium is improperly played back due to adhesion of, for example, dirt, it is determined that the information recording medium is a normal medium.

As in the case of the process S6 (described earlier), the optical pickup 3 accesses the data region (process S10) (data region accessing step). Subsequently, the decoding process section 7 decodes the address information that has been read out from the data region by the first decoding process circuit 71a (process S11) (first address information decoding process step).

Note that unlike the process S7 (described earlier), the process S11, in which an information recording medium loaded in the playback device 1 is a normal medium, makes it possible to decode, without using the second decoding process circuit 71b, the address information read out from the data region.

As in the case of the process S8 (described earlier), the ECC decoding section 8 carries out, as the process for correcting errors in the address information, the ECC decoding with respect to each of the pieces of the address information obtained from the decoding process section 7 (process S12) (second ECC decoding step).

Then, as in the case of the process S9 (described earlier), the optical pickup 3 plays back the content recorded in a given address of the data region (process S13) (data region playing back step). The playback device 1 thus plays back a normal medium by carrying out the above processes S1 through S4 and S10 through S13.

(Effect of Playback Device 1)

The playback device 1 includes the first decoding process circuit 71a for decoding address information recorded in the medium information region 101. This allows the playback device 1 to play back information (particularly, medium identification information) on the optical disk 100 from the medium information region 101 (a non-super-resolution region similar to that of a normal medium) of the optical disk 100 (i.e., super-resolution medium).

This allows the playback device 1 to determine, by irradiating the information recording medium with playback light having normal medium playback power, whether an information recording medium to be played back is a normal medium or a super-resolution medium. That is, a playback device can use successful playback of the medium information region of the information recording medium as a criterion for determining that the optical disk 100 to be played back is a super-resolution medium.

Further, even in a case where it is determined that an information recording medium to be played back is a normal medium, the playback device 1, which includes the first decoding process circuit 71a, can play back address information and content each recorded in the data region of the normal medium.

The playback device 1 also includes the second decoding process circuit 71b for decoding address information recorded in the data region 102. Thus, in a case where it is determined that an information recording medium to be played back (e.g., the optical disk 100) is a super-resolution medium, by irradiating the data region 102, in which information is recorded with higher density than in the medium information region 101, with playback light having super-resolution playback power, the address information and the content can be read out from the data region 102 without fail.

Thus, the playback device 1 can play back both the optical disk 100, which is a super-resolution medium, and a normal medium. That is, the playback device 1 can play back the optical disk 100 while maintaining playback compatibility with a normal medium. Further, the playback device 1 can be said to be suitable to play back the optical disk 100, which is a super-resolution medium suitable to have a greater storage capacity.

Assume here that a conventional playback device which can play back both a normal medium and a super-resolution medium (a conventional super-resolution medium different from the optical disk 100, i.e., a super-resolution medium which has a medium information region and a data region that are both super-resolution regions) cannot read out address information recorded in the medium information region of an information recording medium. In this case, the conventional playback device generally determines that an information recording medium loaded therein is a super-resolution medium. Thus, it may be determined that for example, a normal medium having a surface which is to be irradiated with playback light and to which dirt has adhered is a super-resolution medium.

Meanwhile, only the playback device 1 that has allowed the first decoding process circuit 71a to successfully carry out a decoding process with respect to address information irradiates a medium information region of an information recording medium with playback light having normal medium playback power. Further, only the playback device 1 that has allowed the second decoding process circuit 71b to successfully carry out the decoding process with respect to address information irradiates the medium information region of the information recording medium with playback light having super-resolution medium playback power.

That is, in a case where the first decoding process circuit 71a fails to carry out the decoding process with respect to address information, the information recording medium will not be irradiated with the playback light having super-resolution medium playback power.

Furthermore, on the optical disk 100 which is used in the playback device 1 as a super-resolution medium to be played back, the address information of the medium information region 101 is recorded in the first address data format (described earlier). That is, the medium identification information recorded in the medium information region 101 is read out by use of the playback light having normal medium playback power.

Thus, the playback device 1 in which the optical disk 100 is used as a super-resolution medium to be played back can determine, without irradiating an information recording medium to be played back with the playback light having super-resolution medium playback power, whether the information recording medium to be played back is a normal medium or a super-resolution medium.

In other words, it is impossible that the playback device 1 will determine, due to its inability to read out address information of a medium information region, that an information recording medium to be played back is a super-resolution medium. For example, though it is impossible to read out address information of the medium information region of a normal medium having a surface which is to be irradiated with playback light and to which dirt has adhered, it will not be determined for such a reason that the information recording medium to be played back is a super-resolution medium.

Thus, according to the playback device 1, for example, in a case where a medium information region of an optical disk cannot be played back due to, for example, presence of dirt, it is possible to prevent the optical disk from being erroneously recognized as a super-resolution medium.

This yields an effect of preventing a normal medium that essentially has no problem from suffering from a situation in which the normal medium is broken by being irradiated with playback light having higher playback power for playing back a super-resolution medium.

Embodiment 3

Embodiment 3 of the present invention will be described below with reference to FIGS. 10 and 11. Note that, for convenience, members having functions identical to those of the respective members described in Embodiments 1 and 2 are given respective identical reference numerals, and a description of those members is omitted in Embodiment 3.

(Configuration of Optical Disk 300)

Figure 10:
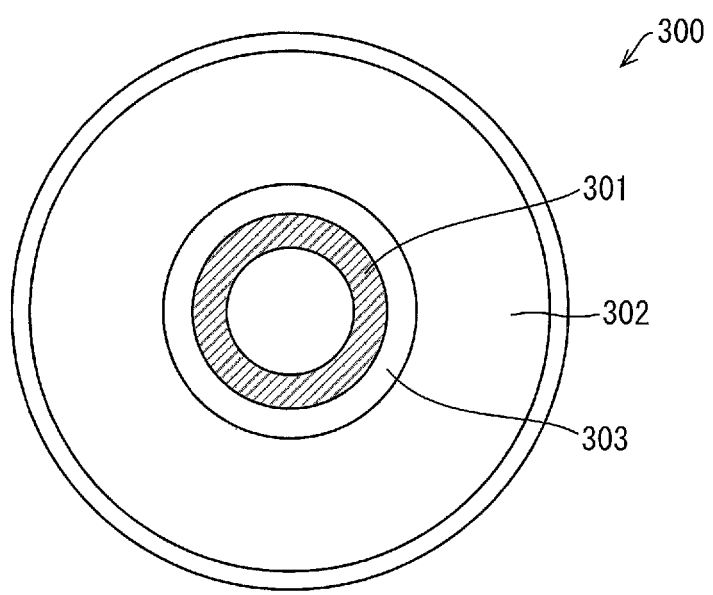
FIG. 10 is a plan view showing an example of a configuration of an optical disk of Embodiment 3 of the present invention.

The following description discusses, with reference to FIG. 10, a configuration of an optical disk 300 (information recording medium). FIG. 10 is a plan view showing an example of a configuration of the optical disk 300. Note that as in the case of the optical disk 100 of Embodiment 1, Embodiment 3 discusses a case where the optical disk 300 is a read-only Blu-ray (registered trademark) Disc (BD).

The optical disk 300, which is a discoid super-resolution medium, has (i) a medium information region 301 (first region), (ii) a data region 302 (second region), and (iii) a blank region 303 (third region).

The medium information region 301 of Embodiment 3 is identical to the medium information region 101 of Embodiment 1. Further, the data region 302 of Embodiment 3 is identical to the data region 102 of Embodiment 1. Thus, the optical disk 300 of Embodiment 3 is obtained by causing the optical disk 100 of Embodiment 1 to further include the blank region 303.

In the optical disk 300, the blank region 303 is provided so as to be outer than the medium information region 301 and inner than the data region 302. That is, the blank region 303 is provided between the medium information region 301 and the data region 302 in a radial direction of the optical disk 300.

The blank region 303 is constituted by a pit group in which no significant information other than an address is recorded. That is, the blank region 303 is a region in which no significant information is recorded. Further, the blank region 303 has a part in which an address format is changed (switched) from a first address data format to a second data format.

Figure 11:
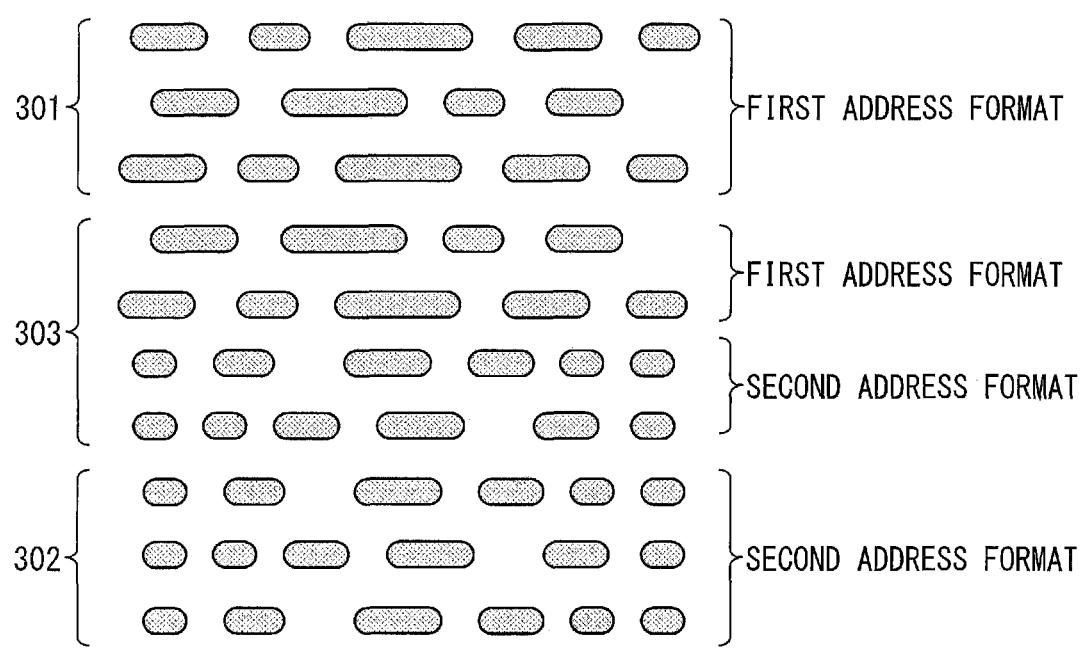
FIG. 11 is an enlarged view of a boundary part among a medium information region, a blank region, and a data region of the optical disk of Embodiment 3 of the present invention.

The following description further specifically discusses the blank region 303 with reference to FIG. 11. FIG. 11 is an enlarged view of a boundary part among the medium information region 301, the blank region 303, and the data region 302 of the optical disk 300.

As illustrated in FIG. 11, the blank region 303 is provided between (a) the medium information region 301, in which address information is recorded in the first address data format, and (b) the data region 302, in which address information is recorded in the second address data format. That is, the blank region 303 is provided so as to serve as a region via which the medium information region 301 and the data region 302 are connected.

As in the case of the medium information region 301, a region of the blank region 303 which region is closer to the medium information region 301 (i.e., a region on an inner side of the blank region 303) is provided with recesses and/or protrusions whose lengths are longer than that of an optical system resolution limit of a playback device and which are formed by a given modulation method (e.g., the 1-7PP modulation recording method) by a pit group that is suited to the first address data format.

As in the case of the data region 302, a region of the blank region 303 which region is closer to the data region 302 (i.e., a region on an outer side of the blank region 303) is provided with recesses and/or protrusions whose lengths are shorter than that of an optical system resolution limit of a playback device and which are formed by a given modulation method (e.g., the 1-7PP modulation recording method) by a pit group that is suited to the second address data format.

Note that it is not particularly limited where in the blank region 303 the region of the blank region 303 which region is closer to the medium information region 301 (i.e., a region in which the pit group that is suited to the first address data format is provided) and the region of the blank region 303 which region is closer to the data region 302 (i.e., a region in which the pit group that is suited to the second address data format is provided) are changed.

(Effect of Optical Disk 300)

It is demanded during playback of an information recording medium via a playback device that playback of a data region (e.g., the data region 302) in which content is recorded be started as soon as possible.

Content recorded in the optical disk 300 is played back via the playback device by playing back medium identification information in the medium information region 301 and then moving an optical pickup in a radial direction while turning off tracking with respect to the medium information region 301. Then, the playback device turns on tracking with respect to the data region 302, and starts playing back the data region 302.

In a case where playback of the data region is immediately started, the optical pickup may track a position that is inner than an innermost part of the data region 302. That is, the optical pickup may track an inaccurate position.

Since the optical disk 300 of Embodiment 3 further includes the blank region 303, as in the case of the data region 302, a region inner than a start region of the data region 302 (i.e., the innermost part of the data region 302) is also provided with recesses and/or protrusions which include a recess and/or a protrusion whose length is shorter than that of an optical system resolution limit of a playback device and which are formed by a given modulation method by a pit group that is suited to the second address data format.

Thus, even in a case where the optical pickup tracks an inaccurate position, a region outer than the blank region 303 will be played back. This allows the playback device to check a playback position by use of a playback setting for playing back the data region 302.

Therefore, the playback device can move the optical pickup to a given position in the data region 302 with reference to the playback position that has been checked as a result of playback of the region outer than the blank region 303.

That is, the optical disk 300 of Embodiment 3 yields an effect of allowing a playback device to immediately start playing back content with higher reliability.

Embodiment 4

Embodiment 4 of the present invention will be described below with reference to FIGS. 12 and 13. Note that, for convenience, members having functions identical to those of the respective members described in Embodiments 1 through 3 are given respective identical reference numerals, and a description of those members is omitted in Embodiment 4.

(Configuration of Optical Disk 300)

Figure 12:
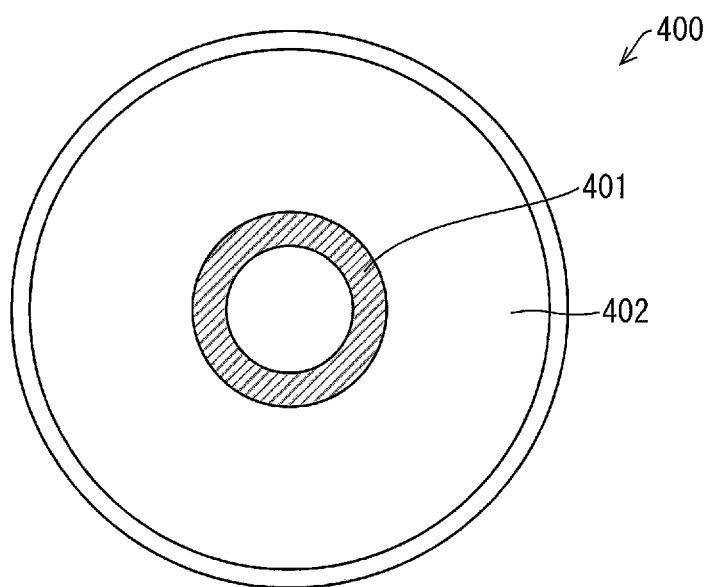
FIG. 12 is a plan view showing an example of a configuration of an optical disk of Embodiment 4 of the present invention.

The following description discusses, with reference to FIG. 12, a configuration of an optical disk 400 (information recording medium). FIG. 12 is a plan view showing an example of a configuration of the optical disk 400. Note that as in the case of the optical disk 100 of Embodiment 1, Embodiment 4 discusses a case where the optical disk 400 is a read-only Blu-ray (registered trademark) Disc (BD).

The optical disk 400, which is a discoid super-resolution medium, has (i) a medium information region 401 (first region) and (ii) a data region 402 (second region). The optical disk 400 differs from each of the optical disk 100 of Embodiment 1 and the optical disk 300 of Embodiment 3 in that the data region 402 has a track pitch shorter than that of the medium information region 401. The other configurations and recorded information of the optical disk 400 are identical to those of the optical disk 100 of Embodiment 1.

Figure 13:
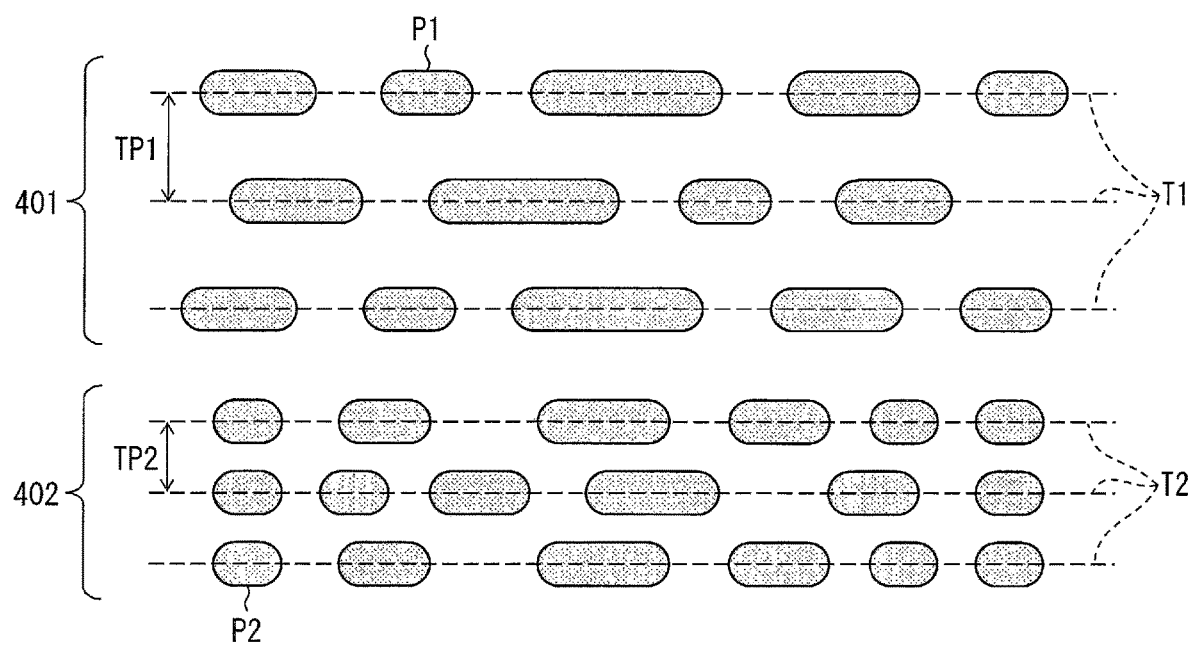
FIG. 13 is an enlarged view of a boundary part between a medium information region and a data region of the optical disk of Embodiment 4 of the present invention.

FIG. 13 is an enlarged view of a boundary part between the medium information region 401 and the data region 402 of the optical disk 400. As illustrated in FIG. 13, the medium information region 401 is provided with a plurality of tracks T1 each constituted by pits P1, and the data region 402 is provided with a plurality of tracks T2 each constituted by pits P2.

The medium information region 401 has a track pitch which is indicated by a track pitch TP1 that is a distance between two adjacent tracks T1 in a radial direction. The data region 402 has a track pitch which is indicated by a track pitch TP2 that is a distance between two adjacent tracks T2 in the radial direction.

The tracks T1 and T2 are provided so that the track pitch TP1 is longer than the track pitch TP2. That is, the data region 402 has the track pitch TP2 which is shorter than the track pitch TP1 of the medium information region 401.

For example, according to Embodiment 4, the tracks T1 and T2 are provided so that the track pitch TP1 (i.e., a track pitch identical to that of the optical disk 100) has a length of 0.35 μm and the track pitch TP2 has a length of 0.29 μm.

It is natural that these values be optionally changeable in a case where the track pitch TP1 is greater than the track pitch TP2. Further, the track pitch TP1 does not necessarily need to be identical to a track pitch of the optical disk 100.

A functional layer (not illustrated, corresponding to the functional layer 192 illustrated in FIG. 3) of the optical disk 400 only needs to be a film (i) that allows a playback optical system to read information recorded by a prepit group provided on a surface of a substrate (not illustrated, corresponding to the substrate 193 illustrated in FIG. 3) of the optical disk 400, and (ii) that allows the track pitch TP2 to have a length (e.g., 0.29 μm) shorter than that of the track pitch TP1.

Specifically, as in the case of the functional layer 192 of the optical disk 100, the functional layer of the optical disk 400 can be made of, for example, a stack of (i) a light absorption film having a thickness of 8 nm and made of a material such as Ta, Al, Ag, Au, or Pt, or a mixture of these materials and (ii) a super-resolution playback film made of a material such as ZnO, $CeO_2$, or $TiO_2$.

(Effect of Optical Disk 400)

According to the optical disk 400, in order that the data region 402 has the track pitch TP2 which is shorter than the track pitch TP1 of the medium information region 401, the tracks T1 are provided in the medium information region 401, and the tracks T2 are provided in the data region 402.

Thus, for example, the optical disk 400, which allows a further increase in number of tracks in the data region 402 as compared with, for example, the case of the optical disk 100, yields an effect of having a greater storage capacity. That is, the optical disk 400 allows recorded information to be denser.

The playback device 1 which plays back information recorded in the optical disk 400 has a function of being suited to both the track pitch TP1 and the track pitch TP2 (i.e., a function of being suited not only to the track pitch TP1 but also to the track pitch TP2) so as to control tracking with respect to the medium information region 401 and the data region 402 without fail.

This function can be carried out by, for example, obtaining a value of the track pitch TP2 as information on the optical disk 400 when the optical pickup 3 obtains medium identification information from the medium information region 401, and reflecting the obtained value in an operation that the optical pickup 3 carries out so as to read out information recorded in the data region 402.

Embodiment 5

Embodiment 5 of the present invention will be described below with reference to FIG. 14. Note that, for convenience, members having functions identical to those of the respective members described in Embodiments 1 through 4 are given respective identical reference numerals, and a description of those members is omitted in Embodiment 5.

(Configuration of Optical Disk 500)

Figure 14:
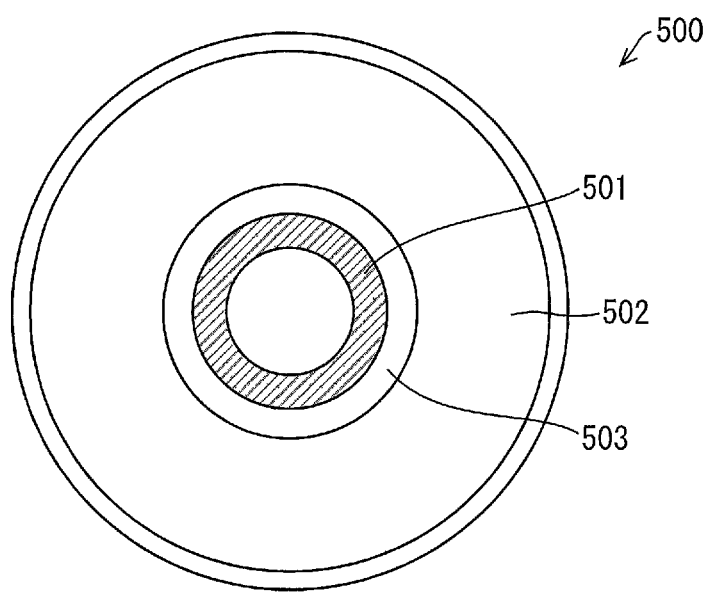
FIG. 14 is a plan view showing an example of a configuration of an optical disk of Embodiment 5 of the present invention.

The following description discusses, with reference to FIG. 14, a configuration of an optical disk 500 (information recording medium). FIG. 14 is a plan view showing an example of a configuration of the optical disk 500. Note that as in the case of the optical disk 100 of Embodiment 1, Embodiment 5 discusses a case where the optical disk 500 is a read-only Blu-ray (registered trademark) Disc (BD).

The optical disk 500, which is a discoid super-resolution medium, has (i) a medium information region 501 (first region), (ii) a data region 502 (second region), and (iii) a blank region 503 (third region).

The medium information region 501 and the data region 502 of Embodiment 5 are identical to the medium information region 401 and the data region 402, respectively, of Embodiment 4. That is, the data region 502 has a track pitch TP2 (of, for example, 0.29 μm) which is shorter than a track pitch TP1 (of, for example, 0.32 μm) of the medium information region 501. Thus, the optical disk 500 of Embodiment 5 is obtained by causing the optical disk 400 of Embodiment 4 to further include the blank region 503.

As in the case of the blank region 303 of Embodiment 3, the blank region 503 of Embodiment 5 is a region that is provided between the medium information region 501 and the data region 502 in a radial direction of the optical disk 500. The blank region 503 is a region in which no significant information other than an address is recorded.

The blank region 503 has a part in which an address format is changed from a first address data format to a second address data format. Further, the blank region 503 has a track pitch TP3 that is provided so as to be shorter from the medium information region 501, which is inner than the blank region 503, toward the data region 502, which is outer than the blank region 503.

That is, the data region 503 has the track pitch TP3 which is arranged so that (i) the blank region 503 has an innermost part (a boundary between the blank region 503 and the medium information region 501) where TP3=TP1=0.32 μm, and (ii) the blank region 503 has an outermost part (i.e., a boundary between the blank region 503 and the data region 502) where TP3=TP2=0.29 μm.

Thus, the blank region 503 is provided so as to have the track pitch TP3 which changes from the track pitch TP1 of the medium information region 501 to the track pitch TP2 of the data region 502. Note that how the track pitch TP3 of the blank region 503 changes is not particularly limited.

Note that the track pitch TP3 does not necessarily need to be shorter from the inner side toward the outer side of the optical disk 500. For example, in a case where the data region 502 is provided on an innermost side of the optical disk 500, and the medium information region 501 is provided on an outermost side of the optical disk 500, the track pitch TP3 only needs to be shorter from the outer side toward the inner side of the optical disk 500.

(Effect of Optical Disk 500)

Since the optical disk 500 of Embodiment 5 further includes the blank region 503, as in the case of the data region 502, a region inner than a start region of the data region 502 (i.e., the innermost part of the data region 502) is also provided with recesses and/or protrusions which include a recess and/or a protrusion whose length is shorter than that of an optical system resolution limit of a playback device and which are formed by a given modulation method (e.g., the 1-7PP modulation recording method) by a pit group that is suited to the second address data format.

Thus, as in the case of Embodiment 3, even in a case where the optical pickup tracks an inaccurate position, a region outer than the blank region 503 will be played back. This allows the playback device to check a playback position by use of a playback setting for playing back the data region 502.

Therefore, the playback device can move the optical pickup to a given position in the data region 502 with reference to the playback position that has been checked as a result of playback of the region outer than the blank region 503.

That is, as in the case of the optical disk 300 of Embodiment 3, the optical disk 500 of Embodiment 5 yields an effect of allowing a playback device to immediately start playing back content with higher reliability.

Furthermore, as in the case of the optical disk 400 of Embodiment 4, according to the optical disk 500 of Embodiment 5, the data region 502 has the track pitch TP2 which is shorter than the track pitch TP1 of the medium information region 501.

Thus, as in the case of the optical disk 400 of Embodiment 4, the optical disk 500 of Embodiment 5 allows an increase in number of tracks in the data region 502. This yields an effect of allowing the optical disk 500 to have a greater recording capacity. That is, the optical disk 500 allows recorded information to be denser.

Modified Example

The above description has discussed Embodiments 1 through 5 by taking, as examples, cases where the optical disks 100, 300, 400, and 500, each of which is an information recording medium, are each assumed to be a BD. However, the information recording medium is not limited to a BD but can be exemplified by various optical disks such as other optical read disks, magneto-optical disks, and phase change disks. Alternatively, the information recording medium can be a magnetic disk.

Note that the above description of Embodiment 2 has taken, as an example, particularly a case where the playback device 1 plays back the optical disk 100. Note, however, that the playback device 1 can play back the optical disks 300, 400, and 500 as well as the optical disk 100.

Furthermore, the above description has discussed Embodiments 1 through 5 by taking, as examples, only cases where the optical disks 100, 300, 400, and 500 are played back as information recording mediums, but such optical disks are not limited to read-only information recording mediums. The optical disk 100, 300, 400, and 500 can also be recordable information recording mediums or rewritable information recording mediums.

Software Implementation Example

Control blocks (especially the control section 9) of the playback device 1 can be realized by a logic circuit (hardware) provided in an integrated circuit (IC chip) or the like or can be alternatively realized by software as executed by a CPU (Central Processing Unit).

In the latter case, the playback device 1 includes a CPU that executes instructions of a program that is software realizing the foregoing functions; ROM (Read Only Memory) or a storage device (each referred to as "storage medium") in which the program and various kinds of data are stored so as to be readable by a computer (or a CPU); and RAM (Random Access Memory) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

SUMMARY

An information recording medium (optical disk 100) according to Aspect 1 of the present invention includes: a first region (medium information region 101) in which type identification information (medium identification information) for identifying a type of the information recording medium is recorded by recesses and/or protrusions which are formed by a given modulation method and whose lengths are longer than a length of an optical system resolution limit of a playback device; and a second region (data region 102) in which content data is recorded by recesses and/or protrusions which are formed by the given modulation method and which include a recess and/or a protrusion whose length is shorter than the length of the optical system resolution limit, the first region containing first address information recorded therein in a first address data format, and the second region containing second address information recorded therein in a second address data format that differs from the first address data format.

According to the arrangement, in the second region of the information recording medium according of an aspect of the present invention, content data is recorded by recesses and/or protrusions which include a recess and/or a protrusion whose length is shorter than the length of the optical system resolution limit. Thus, the information recording medium is a super-resolution medium.

Furthermore, the information recording medium according to an aspect of the present invention is arranged such that the address information of the first region in which type identification information is recorded is recorded in the first address data format. The address information of the second region in which content data is recorded is recorded in the second address data format that differs from the first address data format.

Here, the first address data format has a data structure identical to, for example, a data structure of a normal medium as shown in (a) of FIG. 4. The second address data format has a data structure for a super-resolution medium which data structure enables recording of denser data than a normal medium (e.g., a data structure in which cluster addresses are greater in number of bits (number of addresses) than those of a normal medium), which data structure is for example as shown in (b) of FIG. 4.

Figure 15:
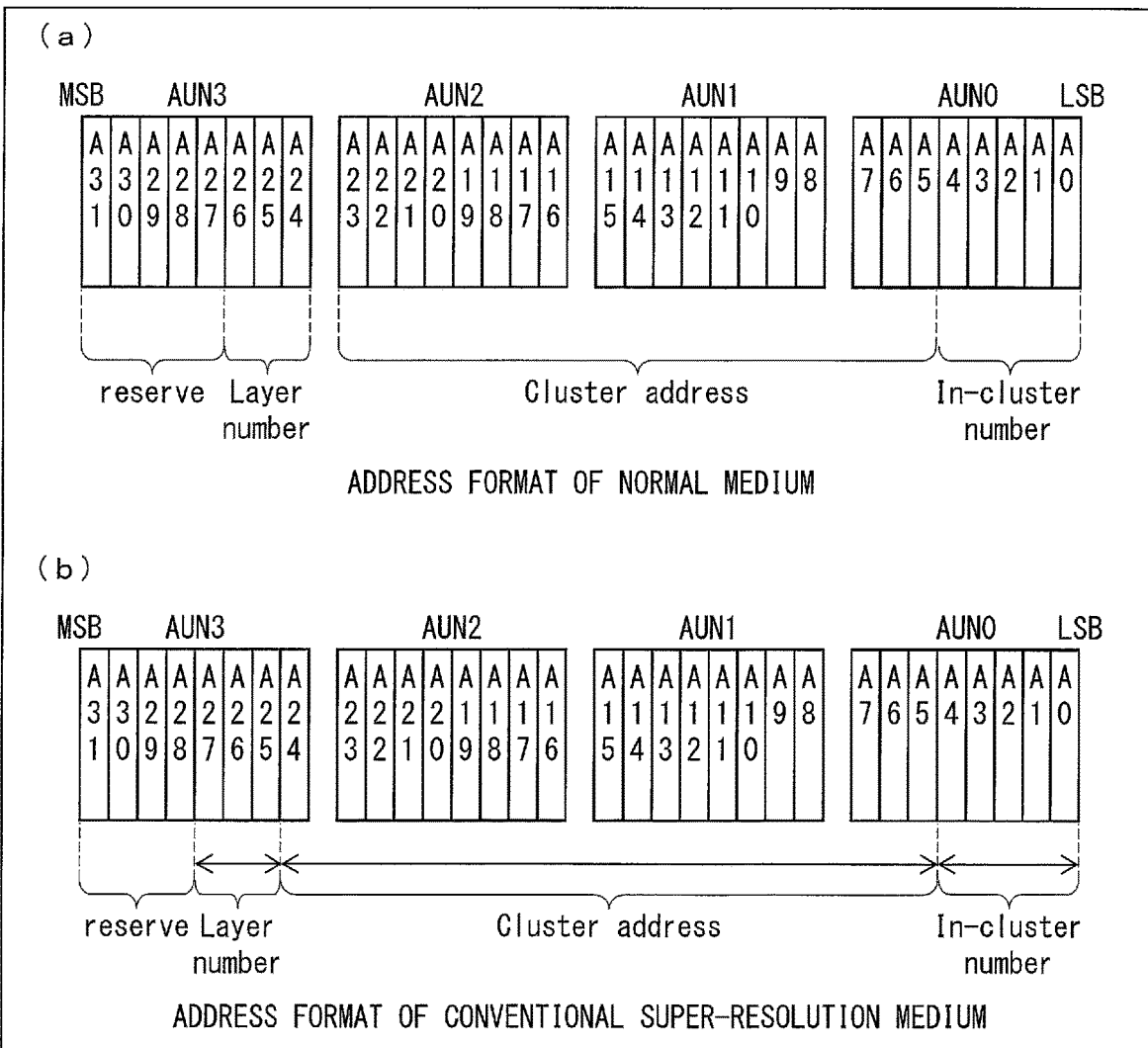
FIG. 15 is a set of views (a) and (b). (a) of FIG. 15 illustrates an address data format of a normal medium disclosed in Patent Literature 1. (b) of FIG. 15 illustrates an address data format of a super-resolution medium disclosed in Patent Literature 1.
Figure 16:
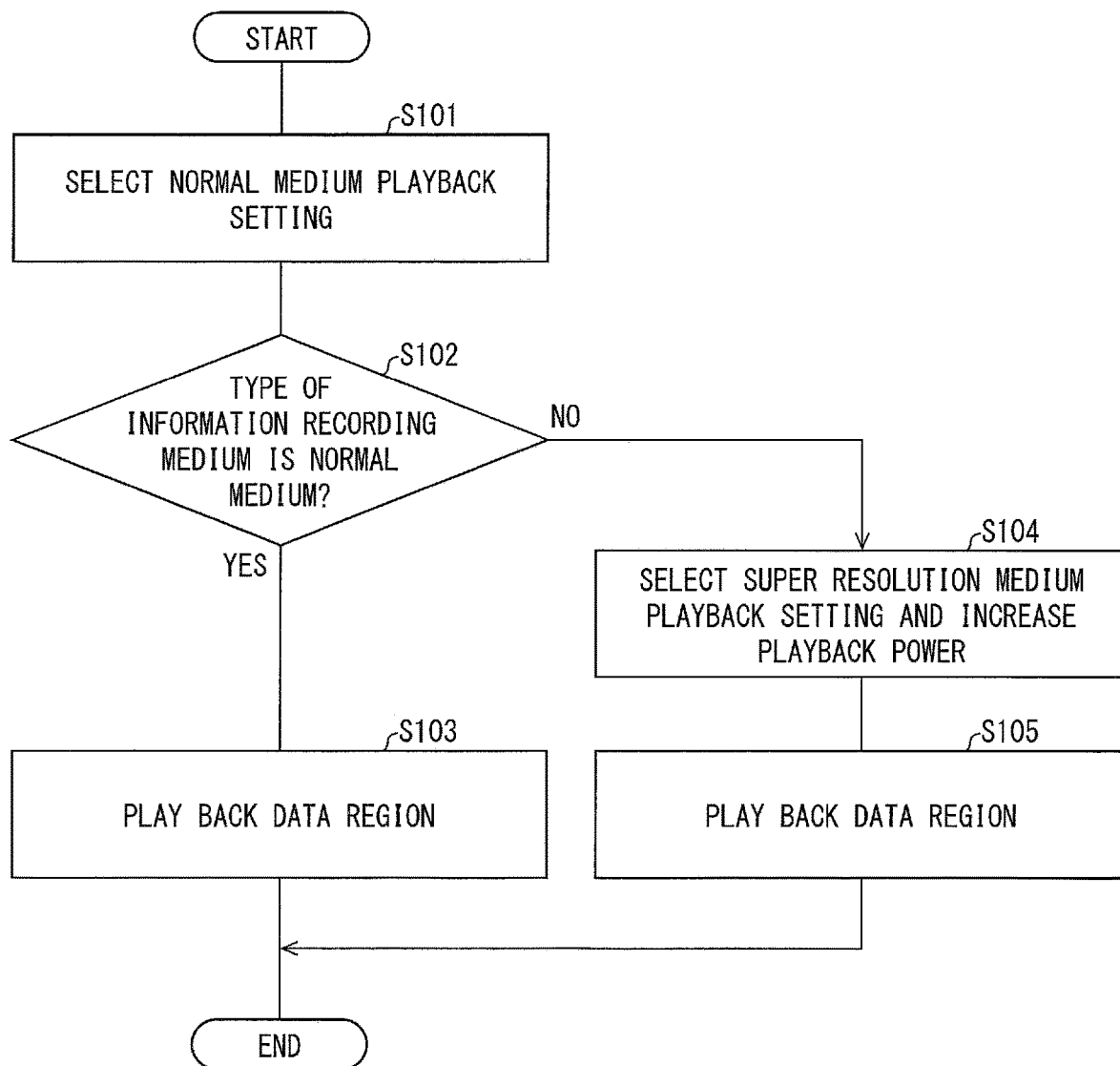
FIG. 16 is a flowchart showing an example of how a conventional playback device plays back an information recording medium.

Meanwhile, a conventional super-resolution medium which differs from the information recording medium according to an aspect of the present invention is arranged such that the data structure for a super-resolution medium which data structure enables recording of denser data than a normal medium is applied to not only a second region, in which content data is recorded, but also a first region, in which type identification information is recorded. For example, according to a conventional super-resolution medium, a data structure for a super-resolution medium as shown in (b) of FIG. 15 is applied to the first region.

Thus, according to a playback device having downward playback compatibility and capable of playing back a conventional super-resolution medium, an inability to play back the medium information region is a criterion for determining that the information recording medium is a super-resolution medium. Thus, in a case where a first region of an information recording medium, which is a normal medium, cannot be played back due to some reason such as adhesion of dirt to the information recording medium, it may be determined that the information recording medium is a super-resolution medium.

However, the information recording medium according to an aspect of the present invention allows a playback device to use successful playback of the first region as a criterion for determining that the information recording medium to be played back is a super-resolution medium. Thus, in a case where the first region cannot be played back due to some reason such as adhesion of dirt to the information recording medium, it is determined that the information recording medium is a normal medium.

That is, the information recording medium according to an aspect of the present invention can prevent a playback device from losing its download compatibility. This can prevent the playback device from erroneously determining that a normal medium is a super-resolution medium.

Thus, it is possible to prevent the occurrence of a situation in which a normal medium that is irradiated with playback light having greater playback power for playing back a super-resolution medium is broken. This yields an effect of allowing the playback device to play back the information recording medium with higher reliability.

A playback device (1) according to Aspect 2 of the present invention for playing back an information recording medium of Aspect 1 can include: a first address information decoding process section (first decoding process circuit 71a) for decoding the first address information recorded in the first region; and a second address information decoding process section (second decoding process circuit 71b) for decoding the second address information recorded in the second region.

According to the arrangement, the playback device which includes the first address information decoding process section can decode address information recorded in the first address data format in the first region (i.e., a region in which type identification information is recorded). Similarly, the playback device which includes the second address information decoding process section can decode address information recorded in the second address data format in the second region (i.e., a region in which content data is recorded).

Thus, it is possible to provide a playback device which is suitable to play back the information recording medium according to an aspect of the present invention while having playback compatibility with a normal medium.

In Aspect 3 of the present invention, the information recording medium (optical disk 300) can be arranged to further include, in Aspect 1, a third region (blank region 303) which is provided between the first region and the second region and in which no significant information other than an address is recorded, the third region having (i) a region that is closer to the first region and is provided with recesses and/or protrusions whose lengths are longer than the length of the optical system resolution limit and which are formed by a given modulation method and (ii) a region that is closer to the second region and is provided with recesses and/or protrusions whose lengths are shorter than the length of the optical system resolution limit and which are formed by the given modulation method.

According to the arrangement, as in the case of the second region, a region of the third region which region is closer to the first region than to a start region of the second region is also provided with recesses and/or protrusions which include a recess and/or a protrusion whose length is shorter than the length of an optical system resolution limit of a playback device and which are formed by the given modulation method.

Thus, even in a case where the optical pickup which has played back the first region and then moved from the first region to the second region so as to start playing back the second region tracks an inaccurate position, a region of the third region which region is closer to the second region will be played back.

Thus, the playback device can move, by use of a playback setting for playing back the second region, the optical pickup to a given position in the second region with reference to a playback position that has been checked as a result of playback of the third region. This yields an effect of allowing a playback device to play back content with higher reliability.

In Aspect 4 of the present invention, the information recording medium (optical disk 400) can be arranged such that, in Aspect 1 or 3, the second region has a track pitch (TP2) that is shorter than a track pitch (TP1) of the first region.

The arrangement allows a further increase in number of tracks in the second region as compared with the case where the track pitch of the second region is equal to the track pitch of the first region. This allows the information recording medium to store denser data.

In Aspect 5 of the present invention, the information recording medium (optical disk 500) can be arranged such that, in Aspect 3, (i) the second region has the track pitch that is shorter than the track pitch of the first region, and (ii) the third region has a track pitch (TP3) that is shorter from the first region toward the second region so that (a) the third region is equal in trach pitch to the first region at a boundary between the first region and the third region and (b) the third region is equal in track pitch to the second region at a boundary between the second region and the third region.

The arrangement allows a further increase in number of tracks in the second region of the information recording medium which further includes the third region. This allows the information recording medium to store denser data.

A playback method according to Aspect 6 of the present invention for controlling the playback device according to Aspect 2 can include (i) a first address information decoding process step of decoding address information recorded in the first region, and (ii) a second address information decoding process step of decoding address information recorded in the second region.

The arrangement allows the playback device to suitably play back the information recording medium according to an aspect of the present invention as in the case of Aspect 2.

The playback device according to Aspect 2 may be realized by a computer. In this case, the present invention encompasses: a control program for the playback device which program causes a computer to operate as the foregoing sections of the playback device so that the playback device can be realized by the computer; and a computer-readable storage medium storing the control program therein.

[Supplementary Note]

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

Note that the present invention can also be expressed as below.

An information recording medium according to an aspect of the present invention includes: a first region in which type identification information for identifying a type of the information recording medium is recorded by recesses and/or protrusions which are formed by a given modulation method and whose lengths are longer than a length of an optical system resolution limit of a playback device; and a second region in which content data is recorded by recesses and/or protrusions which are formed by the given modulation method and which include a recess and/or a protrusion whose length is shorter than the length of the optical system resolution limit, the first region containing first address information recorded therein in a first address data format, and the second region containing second address information recorded therein in a second address data format that differs from the first address data format.

A playback device according to an aspect of the present invention for playing back an information recording medium according to an aspect of the present invention, includes: a first address information decoding process section for decoding the first address information recorded in the first region; and a second address information decoding process section for decoding the second address information recorded in the second region.

INDUSTRIAL APPLICABILITY

The present invention is applicable to (i) an information recording medium in which information can be recorded and (ii) a playback device capable of playing back the information recording medium.

REFERENCE SIGNS LIST

1 Playback device
71a First decoding process circuit (first address information decoding process section)
71b Second decoding process circuit (second address information decoding process section)
100, 300, 400 and 500 Optical disk (information recording medium)
101, 301, 401 and 501 Medium information region (first region)
102, 302, 402 and 502 Data region (second region)

The invention claimed is:

1. An information recording medium comprising:
a first region in which type identification information that identifies a type of the information recording medium is recorded by recesses and/or protrusions which are defined by a given modulation method and whose lengths are longer than a length of an optical system resolution limit of a playback device;
a second region in which content data is recorded by recesses and/or protrusions which are defined by the given modulation method and which include a recess and/or a protrusion whose length is shorter than the length of the optical system resolution limit; and
a blank region between the first region and the second region, wherein
the first region includes first address information recorded therein in a first address data format,
the second region includes second address information recorded therein in a second address data format that differs from the first address data format,
the blank region (i) includes a portion in which the first address data format is switched to the second address data format and (ii) includes address information and no significant information other than the address information,
the first region includes first error correction encoding data and the second region includes second error correction encoding data, and
error correction encoding of third error correction encoding data in a region on an outer side of the blank region is identical to error correction encoding in the second region.

2. A playback device that plays back an information recording medium recited in claim 1, said playback device comprising:
a first address information decoding process section that decodes the first address information recorded in the first region;
a second address information decoding process section that decodes the second address information recorded in the second region;
an error correction encoding process section of the first region; and
an error correction encoding process section of the second region, wherein
the playback device checks a playback position by use of a playback setting that plays back the second region, the playback position being checked on an inner side of a start region of the second region, and
the playback device plays back the region on the outer side of the blank region with the error correction encoding process section of the second region.

* * * * *